United States Patent
Moritomo

(10) Patent No.: US 11,503,447 B2
(45) Date of Patent: Nov. 15, 2022

(54) POWER RECEIVING APPARATUS, CONTROL METHOD OF POWER RECEIVING APPARATUS, AND STORAGE MEDIUM

(71) Applicant: CANON KABUSHIKI KAISHA, Tokyo (JP)

(72) Inventor: Kazuo Moritomo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/189,028

(22) Filed: Mar. 1, 2021

(65) Prior Publication Data

US 2021/0185503 A1 Jun. 17, 2021

Related U.S. Application Data

(63) Continuation of application No. 16/693,043, filed on Nov. 22, 2019, now Pat. No. 10,972,890.

(30) Foreign Application Priority Data

Nov. 28, 2018 (JP) .............................. JP2018-222507

(51) Int. Cl.
| | |
|---|---|
| *H04B 5/00* | (2006.01) |
| *H04W 4/80* | (2018.01) |
| *H02J 50/60* | (2016.01) |
| *H02J 50/80* | (2016.01) |
| *H02J 50/10* | (2016.01) |

(52) U.S. Cl.
CPC .............. *H04W 4/80* (2018.02); *H02J 50/10* (2016.02); *H04B 5/0093* (2013.01)

(58) Field of Classification Search
None
See application file for complete search history.

(56) References Cited

U.S. PATENT DOCUMENTS

| | | | | |
|---|---|---|---|---|
| 9,106,086 | B2* | 8/2015 | Low ..................... | H04B 5/0037 |
| 9,935,502 | B2* | 4/2018 | Low ...................... | H02J 50/12 |
| 9,941,750 | B2* | 4/2018 | Shichino ................. | H02J 50/20 |
| 9,997,927 | B2* | 6/2018 | Eguchi .................... | H02J 5/005 |
| 10,050,477 | B2* | 8/2018 | Nago ....................... | H02J 50/12 |
| 10,224,761 | B2* | 3/2019 | Jung ...................... | H02J 50/402 |
| 10,367,368 | B2* | 7/2019 | Yuk ......................... | H02J 7/025 |
| 10,396,583 | B2* | 8/2019 | Maugars ................. | H02J 7/025 |
| 10,439,445 | B2* | 10/2019 | Jung ....................... | H02J 7/025 |
| 10,530,426 | B2* | 1/2020 | Park ........................ | H02J 50/10 |
| 10,581,280 | B2* | 3/2020 | Shichino ............. | H04W 52/367 |
| 10,601,260 | B2* | 3/2020 | Takahashi ............... | H02J 50/40 |

(Continued)

*Primary Examiner* — Tuan A Tran

(74) *Attorney, Agent, or Firm* — Canon U.S.A., Inc. IP Division

(57) ABSTRACT

A power receiving apparatus includes a power receiving unit configured to wirelessly receive power from a power transmission apparatus, a communication unit configured to perform communication based on a standard of Near Field Communication (NFC), a detection unit configured to detect the power transmission apparatus, and a control unit configured to control the communication unit not to perform the communication based on the standard of NFC based on detection of the power transmission apparatus by the detection unit, wherein the power receiving unit receives power after the control unit controls the communication unit not to perform communication based on the standard of NFC.

30 Claims, 14 Drawing Sheets

(56) References Cited

U.S. PATENT DOCUMENTS

| | | | |
|---|---|---|---|
| 10,686,338 B2* | 6/2020 | Lee | H02J 50/12 |
| 10,693,320 B2* | 6/2020 | Chang | H04B 5/0031 |
| 10,848,011 B2* | 11/2020 | Jung | H02J 50/40 |
| 10,879,744 B2* | 12/2020 | Van Wageningen | H02J 50/12 |
| 11,005,303 B2* | 5/2021 | Park | H02J 7/02 |
| 11,063,477 B2* | 7/2021 | Shichino | H04B 1/16 |
| 11,139,698 B2* | 10/2021 | Jung | H02J 50/12 |
| 2021/0036556 A1* | 2/2021 | Jung | H02J 50/40 |

* cited by examiner

POWER RECEIVING APPARATUS, CONTROL METHOD OF POWER RECEIVING APPARATUS, AND STORAGE MEDIUM

CROSS-REFERENCE TO RELATED APPLICATIONS

This application is a continuation of U.S. application Ser. No. 16/693,043, which was filed on Nov. 22, 2019 and which claims priority to Japanese Patent Application No. 2018-222507, which was filed on Nov. 28, 2018, both of which are hereby incorporated by reference herein in their entireties.

BACKGROUND

Field of the Disclosure

The present disclosure relates to a power receiving apparatus, a control method of a power receiving apparatus, and a storage medium.

Description of the Related Art

In recent years, the technological development of wireless power transmission systems such as a wireless charging system has been widely conducted. Japanese Patent Application Laid-Open No. 2016-007116 discusses a power transmission apparatus and a power receiving apparatus that are compliant with a standard (hereinafter, referred to as a "WPC standard") stipulated by a Wireless Power Consortium (WPC), which is a group for developing standards of wireless charging.

A Near Field Communication (NFC) method is one type of a wireless communication method. In addition, a standard (specification) stipulated by the NFC forum defines a card emulation mode in which a battery-driven NFC module emulates an NFC tag or an NFC card (hereinafter, collectively referred to as an "NFC tag"). Moreover, the NFC forum also defines a reader/writer mode for reading an NFC tag and a peer-to-peer mode for directly exchanging messages between NFC devices. Among power receiving apparatuses such as smartphones that are compliant with the WPC standard, some power receiving apparatuses include an NFC module operating in these modes, and perform communication based on the standard of NFC.

An NFC tag does not include a battery and is driven using energy of electromagnetic wave transmitted from a communication partner in communication. If the above-described power transmission apparatus wirelessly transmits high power to this NFC tag, an antenna element included in the NFC tag can possibly be damaged. It can be considered that, for avoiding such a situation, the power transmission apparatus restricts power transmission when the power transmission apparatus detects an object performing communication based on the standard of NFC. Nevertheless, in such a configuration, the following issues are generated. More specifically, when the power transmission apparatus detects an object performing communication based on the standard of NFC, the power transmission apparatus is considered to restrict power transmission irrespective of whether the object is an NFC tag or a power receiving apparatus performing communication based on the standard of NFC. Thus, if power transmission to a power receiving apparatus performing communication based on the standard of NFC is restricted, the amount of received power may be insufficient.

SUMMARY

Some embodiments are directed to enabling a power receiving apparatus that performs communication based on a standard of NFC to appropriately receive power.

According an aspect of some embodiments, a power receiving apparatus includes a power receiving unit configured to wirelessly receive power from a power transmission apparatus, a communication unit configured to perform communication based on a standard of Near Field Communication (NFC), a detection unit configured to detect the power transmission apparatus, and a control unit configured to control the communication unit not to perform the communication based on the standard of NFC based on detection of the power transmission apparatus by the detection unit, wherein the power receiving unit receives power after the control unit controls the communication unit not to perform communication based on the standard of NFC.

Further features of various embodiments will become apparent from the following description of exemplary embodiments with reference to the attached drawings.

DESCRIPTION OF THE EMBODIMENTS

Hereinafter, exemplary embodiments will be described in detail with reference to the drawings. The following exemplary embodiments are mere examples and are not intended to limit the scope of all embodiments to the configurations and methods described in the exemplary embodiments.
(Configuration of System)

Figure 1:
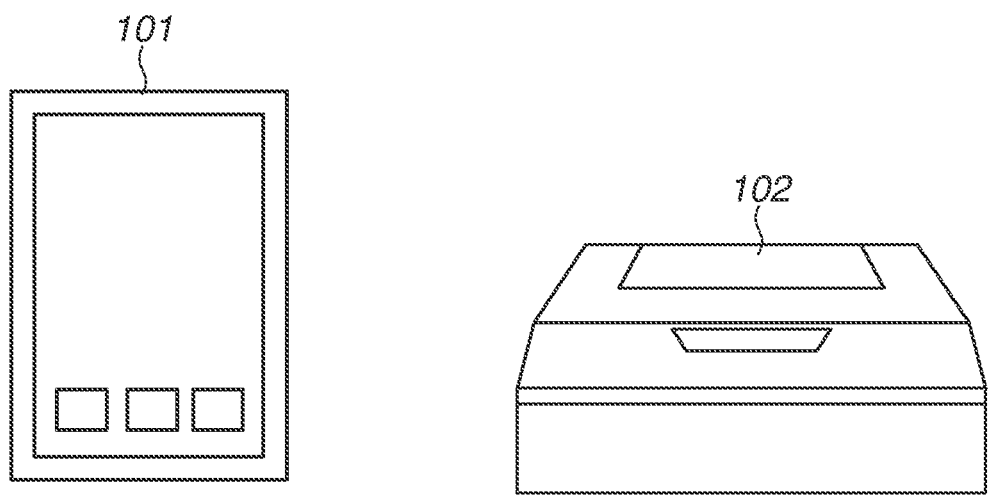
FIG. 1 is a diagram illustrating a configuration example of a wireless charging system.

Hereinafter, a first exemplary embodiment will be described. FIG. 1 illustrates a configuration example of a wireless charging system (wireless power transmission system) according to the present exemplary embodiment. The system includes a power receiving apparatus 101 and a power transmission apparatus 102. Hereinafter, a power receiving apparatus will be referred to as an RX and a power transmission apparatus will be referred to as a TX. The RX 101 and the TX 102 are compliant with a Wireless Power Consortium (WPC) standard. The RX 101 receives power from the TX 102 and enables a battery to be charged. The TX 102 is an electronic device that wirelessly transmits power to the RX 101 placed on a charging stand of the TX 102. Hereinafter, the description will be given using an example case where the RX 101 is placed on the charging stand. Nevertheless, when the TX 102 transmits power to the RX 101, the RX 101 only needs to exist within a power transmittable range (operating volume) of the TX 102 and may not need to be placed on the charging stand.

The RX 101 and the TX 102 can include a function of executing an application other than wireless charging. As an example, the RX 101 is a smartphone and the TX 102 is an accessory device for charging the smartphone. The RX 101 and the TX 102 may be storage devices, such as hard disc devices or memory devices, or may be an information processing apparatus, such as a personal computer (PC). Alternatively, the RX 101 and the TX 102 may be imaging apparatuses (camera, video camera, etc.), for example. The RX 101 and the TX 102 may be image input apparatuses, such as scanners, or may be image output apparatuses, such as printers, copiers, or projectors. Also, the TX 102 may be a smartphone. In this case, the RX 101 may be another smartphone, or may be a wireless earphone. Then, the RX 101 may be an automobile. Furthermore, the TX 102 may be a charger which is set on a console or the like in an automobile.

The RX 101 is equipped with a Near Field Communication (hereinafter, referred to as "NFC") function, and can read an NFC tag or perform electronic money payment, for example, using the function. The TX 102 is also equipped with the NFC function for reading an NFC tag. The TX 102 can detect an NFC tag by performing communication based on a standard of NFC. Furthermore, the TX 102 can stop or restrict power transmission processing based on the detection result to protect an NFC tag.

The system performs wireless power transmission using an electromagnetic induction method for wireless charging, based on the WPC standard. For example, the RX 101 and the TX 102 perform wireless power transmission for wireless charging that is based on the WPC standard, between a power receiving antenna of the RX 101 and a power transmission antenna of the TX 102. In addition, a wireless power transmission method applied to the system is not limited to a method defined by the WPC standard, and may be an electromagnetic induction method, a magnetic field resonance method, an electric field resonance method, a microwave method, or a method using a laser. In the present exemplary embodiment, wireless power transmission is used for wireless charging, but wireless power transmission may be performed for purposes other than wireless charging.

In the WPC standard, the magnitude of power that can be guaranteed when the RX 101 receives power from the TX 102 is defined by a value of guaranteed power (hereinafter, referred to as "GP"). The value of GP indicates a value of power guaranteed to be output to a load in the RX 101 (e.g., charging circuit, etc.) even if a positional relationship between the RX 101 and the TX 102 varies and power transmission efficiency between the power receiving antenna and the power transmission antenna declines, for example. When the value of GP indicates 5 watts, for example, the TX 102 performs power transmission while controlling power such that power of 5 watts can be output to the load in the RX 101 even if a positional relationship between the power receiving antenna and the power transmission antenna varies and power transmission efficiency declines.

The RX 101 and the TX 102 according to the present exemplary embodiment perform communication for power transmission and reception control that is based on the WPC standard. The WPC standard defines a plurality of phases including a Power Transfer Phase in which power transfer is executed, and phases preceding actual power transfer, and communication for power transmission and reception control required in each phase is performed. The phases preceding power transfer include a Selection Phase, a Ping Phase, an Identification and Configuration Phase, a Negotiation Phase, and a Calibration Phase. Hereinafter, the Identification and Configuration Phase will be referred to as an I&C Phase.

In the Selection Phase, the TX 102 intermittently transmits an Analog Ping, and detects that an object is placed on the charging stand of the TX 102 (e.g., the RX 101 or a conductor strip is placed on the charging stand). The TX 102 detects at least either one of a voltage value and a current value of the power transmission antenna that are obtainable when the Analog Ping is transmitted, determines that an object exists if the voltage value falls below a certain threshold or if the current value exceeds a certain threshold, and shifts to the Ping Phase.

In the Ping Phase, the TX 102 transmits a Digital Ping having larger power than the Analog Ping. The Digital Ping has power large enough for activating a control unit of the RX 101 placed on a charging stand. The RX 101 notifies the magnitude of received voltage to the TX 102. In this manner, by receiving a response from the RX 101 that has received the Digital Ping, the TX 102 recognizes that the object detected in the Selection Phase is the RX 101. If the TX 102 receives the notification of a received voltage value, the TX 102 shifts to the I&C Phase.

In the I&C Phase, the TX 102 identifies the RX 101 and acquires device configuration information (capability information) from the RX 101. Thus, the RX 101 transmits an ID Packet and a Configuration Packet to the TX 102. The ID Packet includes identification information of the RX 101 and the Configuration Packet includes device configuration information (capability information) of the RX 101. The TX 102 that has received the ID Packet and the Configuration Packet returns an acknowledge (ACK) as a response. Then, the I&C Phase is ended.

In the Negotiation Phase, a value of GP is determined based on a value of GP required by the RX 101 or power transmission capability of the TX 102.

In the Calibration Phase, the RX 101 notifies a received power value to the TX 102 and the TX 102 performs adjustment for efficiently transmitting power, based on the WPC standard.

In the Power Transfer Phase, control for a start or continuation of power transmission and for a stop of power transmission caused due to an error or full charge is performed.

For the above-described power transmission and reception control, the TX 102 and the RX 101 perform communication (hereinafter, referred to as "first communication") for superimposing a signal on electromagnetic waves transmitted from an antenna, using the same antenna (coil) as that for wireless power transmission, based on the WPC standard. A range in which the first communication that is based on the WPC standard can be performed between the TX 102 and the RX 101 is substantially similar to a power transmissible range in which the TX 102 can transmit power.

To perform the above-described power transmission and reception control, the TX 102 and the RX 101 may perform communication (hereinafter, referred to as "second communication") using an antenna and a frequency that are different from those for wireless power transmission. For example, a frequency band of electromagnetic waves used in the second communication is higher than a frequency band of electromagnetic waves used in the first communication. In this case, by using the second communication, it is possible to perform higher-speed communication than that performed in the case of using the first communication.

Examples of the second communication include a communication method that is compliant with a Bluetooth ® Low Energy (hereinafter, referred to as "BLE") standard. In this case, the TX 102 operates as a Peripheral in the BLE standard and the RX 101 operates as a Central in the BLE standard, but these roles according to the BLE standard may be reversed. In addition, the second communication may be performed in compliance with another communication method, such as a wireless local area network (LAN) (e.g., Wi-Fi®) of the IEEE802.11 standard series or ZigBee. When the TX 102 can perform the second communication and the RX 101 exists in the power transmissible range, the RX 101 and the TX 102 can exchange information by the second communication.

(Apparatus Configuration)

Subsequently, configurations of the power receiving apparatus 101 (the RX 101) and the power transmission apparatus 102 (the TX 102) according to the present exemplary embodiment will be described. The configurations to be described below are mere examples, and a part (or all depending on the case) of the configurations to be described may be omitted or substituted with another configuration having another similar function, or yet another configuration may be added to the configurations to be described. Furthermore, one block to be described below may be divided into a plurality of blocks or a plurality of blocks may be merged into one block.

Figure 2:
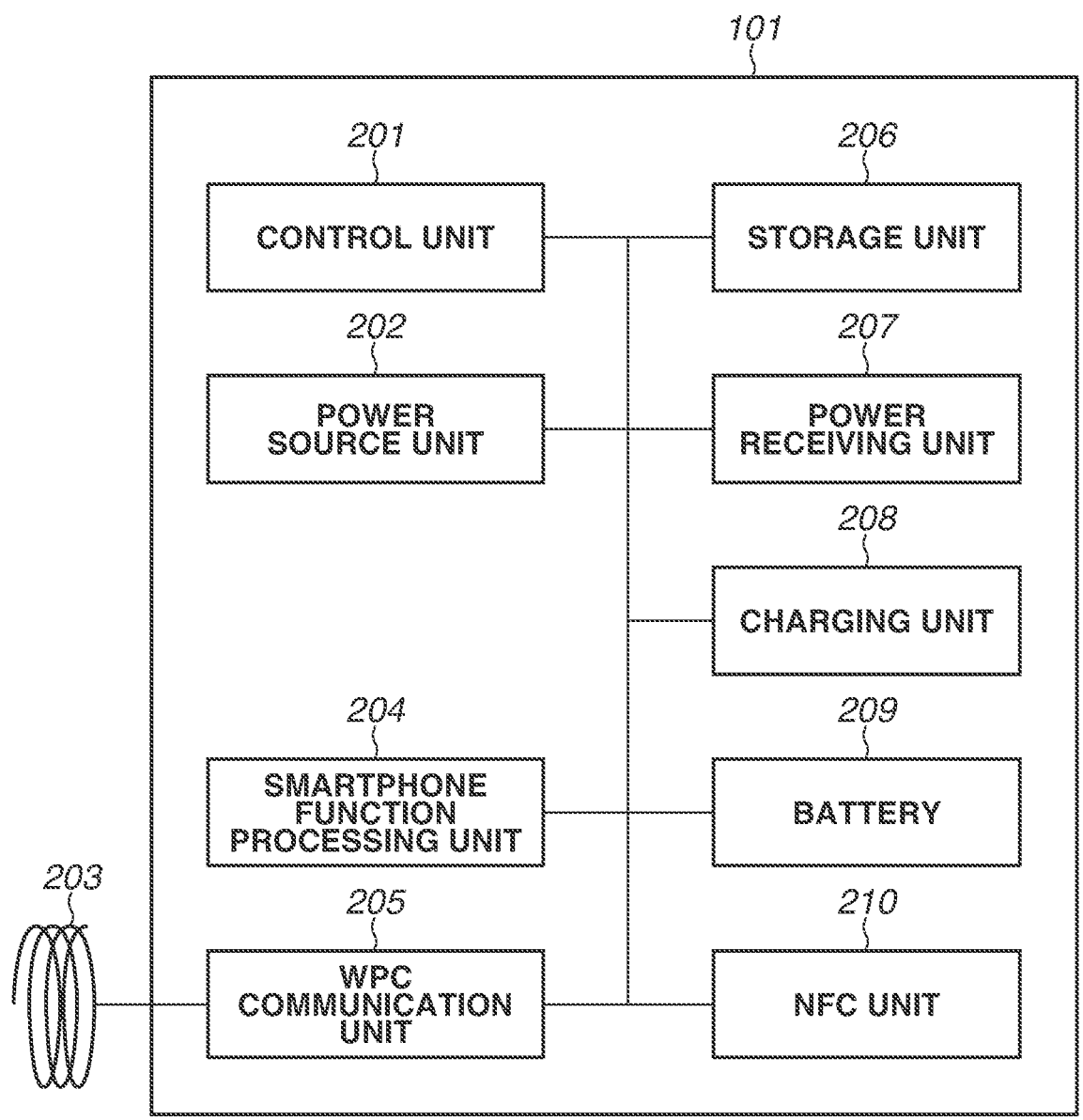
FIG. 2 is a functional block diagram illustrating a configuration example of a power receiving apparatus according to a first exemplary embodiment.

FIG. 2 is a functional block diagram illustrating a configuration example of the RX 101 according to the present exemplary embodiment. The following description will be given using a smartphone as an example of the RX 101, but the RX 101 according to the present exemplary embodiment is not limited to this.

The RX 101 includes a control unit 201, a power source unit 202, a power receiving antenna 203, a smartphone function processing unit 204, a WPC communication unit 205, a storage unit 206, a power receiving unit 207, a charging unit 208, a battery 209, and an NFC unit 210. In addition, a plurality of functional blocks illustrated in FIG. 2 may be implemented as one hardware module.

The control unit 201 controls the entire smartphone (i.e., the RX 101) by executing a control program stored in the storage unit 206, for example. In other words, the control unit 201 controls each functional unit illustrated in FIG. 2. Furthermore, the control unit 201 may perform control for executing an application other than wireless power transmission. As an example, the control unit 201 includes one or more processors, such as a central processing unit (CPU) or a microprocessor unit (MPU). In addition, the entire smartphone may be controlled by cooperation with an operating system (OS) executed by the control unit 201.

In addition, the control unit 201 may include hardware dedicated for specific processing, such as an application specific integrated circuit (ASIC). In addition, the control unit 201 may include an array circuit, such as a field programmable gate array (FPGA) compiled so as to execute predetermined processing. The control unit 201 causes the storage unit 206 to store information to be stored during the execution of various types of processing. In addition, the control unit 201 can measure time using a timer (not illustrated).

The power source unit 202 supplies power to each functional block in conjunction with the charging unit 208 and the battery 209. The smartphone function processing unit 204 includes those functions normally included in a smartphone, such as a user interface (UI), a phone call unit, and an interne processing unit. The descriptions of these functions will be omitted.

The WPC communication unit 205 performs the above-described communication for power reception control that is based on the WPC standard, with a communication unit included in the TX 102. The WPC communication unit 205 acquires information transmitted from the TX 102 by demodulating electromagnetic waves input from the power receiving antenna 203, and performs the first communication with the TX 102 by superimposing, on electromagnetic waves, information to be transmitted to the TX 102 by performing load modulation on the electromagnetic waves. In other words, the first communication performed by the WPC communication unit 205 is performed by superimposition of a signal related to information to be transmitted to the TX 102 on electromagnetic waves transmitted from the power transmission antenna of the TX 102. The WPC communication unit 205 may communicate with the TX 102 using the second communication in place of the first communication, or may communicate with the TX 102 using both of the first communication and the second communication. In addition, when the WPC communication unit 205 performs the second communication, the RX 101 includes an antenna different from the power receiving antenna 203. During the power reception, the WPC communication unit 205 performs the above-described communication for power reception control that is based on the WPC standard, with the communication unit included in the TX 102.

The storage unit 206 stores a control program and also stores states of the RX 101 and the TX 102, for example.

The power receiving unit 207 acquires power generated in the power receiving antenna 203. Specifically, the power receiving unit 207 acquires alternating-current power (alternating-current voltage and alternating current) generated in the power receiving antenna 203 by electromagnetic induction caused by electromagnetic waves emitted from the power transmission antenna of the TX 102. Then, the power receiving unit 207 converts the alternating-current power into direct-current power or alternating-current power with a predetermined frequency, and outputs power to the charging unit 208 that performs processing for charging the battery 209. In other words, the power receiving unit 207 supplies power to a load in the RX 101. The above-described value of GP indicates an amount of power guaranteed to be output from the power receiving unit 207. The power receiving unit 207 has the capability to supply power for the charging unit 208 to charge the battery 209 and supply power for outputting power of 15 watts to the charging unit 208.

The NFC unit 210 performs communication processing with another communication device using the NFC function. The NFC unit 210 operates in modes that are compliant with a specification stipulated by the NFC forum, for example. The above-described modes include, for example, a card emulation mode substituted for a role as a noncontact IC card, a reader/writer mode for reading an NFC tag, and a peer-to-peer mode (P2P) mode for NFC devices directly exchanging messages. For example, electronic money payment is executable by the card emulation mode. The NFC unit 210 includes an antenna (not illustrated), different from the power receiving antenna 203, for performing near field communication.

Figure 3:
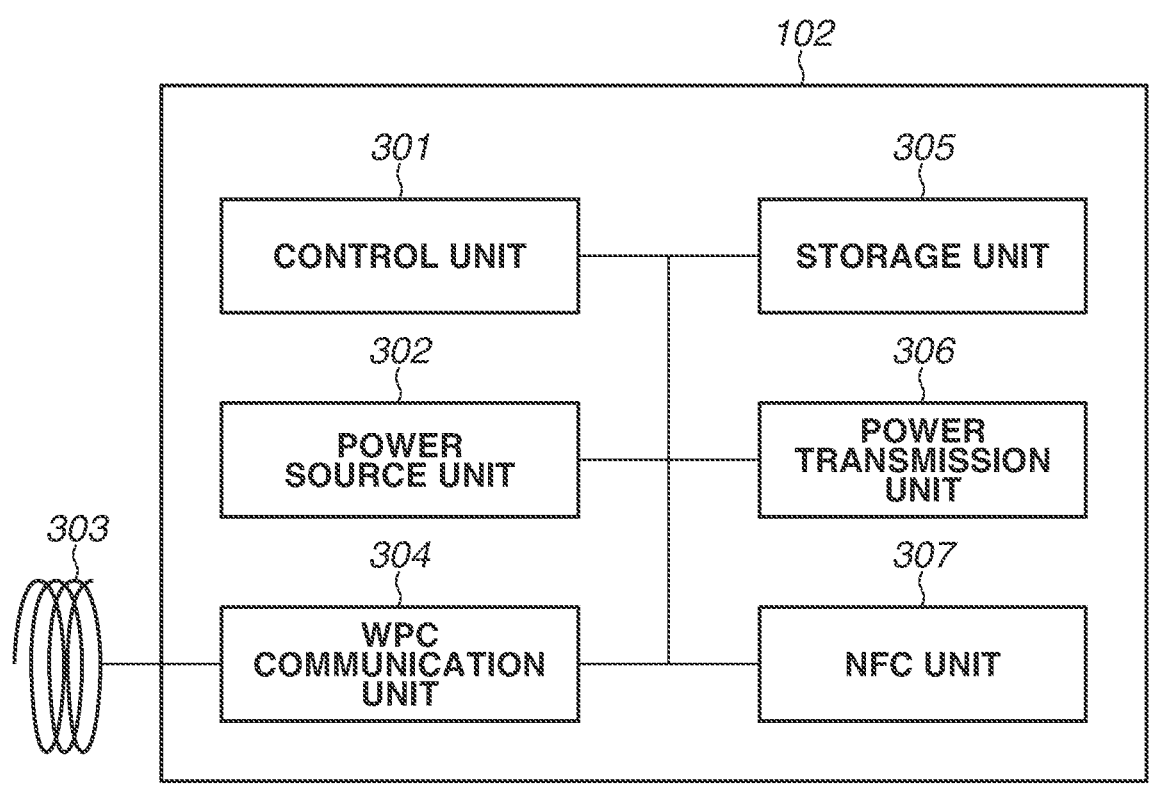
FIG. 3 is a functional block diagram illustrating a configuration example of a power transmission apparatus according to the first exemplary embodiment.

FIG. 3 is a functional block diagram illustrating a configuration example of the TX 102 according to the present exemplary embodiment. As an example, the TX 102 includes a control unit 301, a power source unit 302, a power transmission antenna 303, a WPC communication unit 304, a storage unit 305, a power transmission unit 306, and an NFC unit 307. In FIG. 3, the control unit 301, the power source unit 302, the power transmission unit 306, the WPC communication unit 304, the storage unit 305, and the NFC unit 307 are described as separate units, but a plurality of arbitrary functional blocks among these units may be mounted on the same chip.

The control unit 301 controls the entire power transmission apparatus by executing a control program stored in the storage unit 305, for example. In other words, the control unit 301 controls each functional unit illustrated in FIG. 3. The control unit 301 further performs control related to the control of power transmission in the TX 102. The control unit 301 may perform control for executing an application other than wireless power transmission. The control unit 301 includes one or more processors, such as a CPU(s) or a MPU(s). In addition, the control unit 301 may include hardware dedicated for specific processing, such as an ASIC, or an array circuit, such as an FPGA, compiled so as to execute predetermined processing. The control unit 301 causes the storage unit 305 to store information to be stored during the execution of various types of processing. In addition, the control unit 301 can measure a time using a timer (not illustrated).

The power source unit 302 supplies power to each functional block. The power source unit 302 is a commercial power source or a battery, for example. Power supplied from the commercial power source is stored in the battery.

The WPC communication unit 304 performs the above-described control communication that is based on the WPC standard, with the RX 101. The WPC communication unit 304 performs the first communication by modulating electromagnetic waves output from the power transmission antenna 303 and transferring information to the RX 101. In addition, the WPC communication unit 304 acquires information transmitted by the RX 101 by demodulating the electromagnetic waves output from the power transmission antenna 303 and modulated by the RX 101. In other words, the first communication performed by the WPC communication unit 304 is performed by superimposition of the information on the electromagnetic waves transmitted from the power transmission antenna 303. In addition, the WPC communication unit 304 may communicate with the RX 101 using the second communication in place of the first communication, or may communicate with the RX 101 using both of the first communication and the second communication. In addition, when the WPC communication unit 304 performs the second communication, the TX 102 includes an antenna different from the power transmission antenna 303. During the power transmission, the WPC communication unit 304 performs the above-described control communication that is based on the WPC standard, with the WPC communication unit 205 included in the RX 101.

The storage unit 305 stores a control program and also stores states of the TX 102 and the RX 101.

The power transmission unit 306 converts direct-current power or alternating-current power input from the power source unit 302 into alternating-current frequency power in a frequency band used for wireless power transmission, and the power transmission unit 306 generates electromagnetic waves for causing the RX 101 to receive power by inputting the alternating-current frequency power to the power transmission antenna 303. For example, the power transmission unit 306 converts direct-current voltage supplied from the power source unit 302 into alternating-current voltage, using a switching circuit having a half-bridge or full-bridge configuration that uses a field-effect transistor (FET). In this case, the power transmission unit 306 includes a gate driver that controls the ON/OFF of the FET.

By adjusting either one or both of voltage (power transmission voltage) and current (power transmission current) to be input to the power transmission antenna 303, the power transmission unit 306 controls the intensity of electromagnetic waves to be output. If power transmission voltage or power transmission current is increased, the intensity of electromagnetic waves gets higher, and if power transmission voltage or power transmission current is decreased, the intensity of electromagnetic waves gets lower. In addition, based on an instruction from the control unit 301, the power transmission unit 306 performs output control of alternating-current frequency power so as to start or stop power transmission from the power transmission antenna 303. In addition, the power transmission unit 306 has the capability to supply power for outputting power of 15 watts to the charging unit 208 of the RX 101 that is compliant with the WPC standard.

The NFC unit 307 performs communication processing with another communication device using the NFC function. The NFC unit 307 can detect the existence of an NFC device. The NFC device includes both of an NFC tag and a device having an activated NFC function. In the NFC device detection performed by the NFC unit 307, it is difficult to distinguish between an NFC tag and a device having an activated NFC function. Thus, if an NFC device is detected by the NFC unit 307, because the NFC device might be an NFC tag, the control unit 301 restricts power transmission by controlling the power transmission unit 306 to stop power transmission or reduce power to be transmitted. The NFC unit 307 includes an antenna (not illustrated), different from the power transmission antenna 303, for performing communication related to the standard of NFC.

(Flow of Processing)

Figure 4:
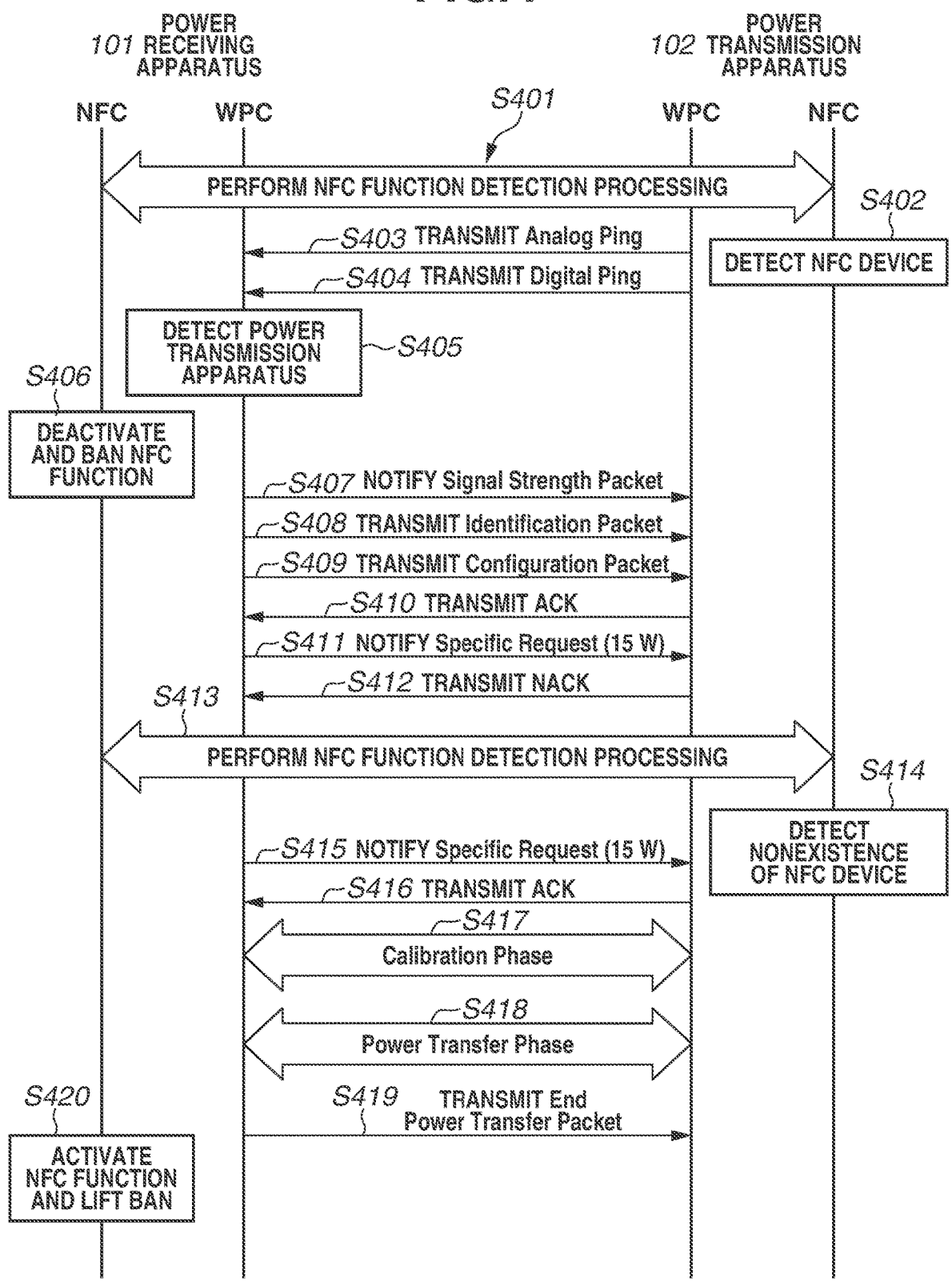
FIG. 4 is a diagram illustrating an operation sequence of a wireless charging system according to the first exemplary embodiment.

FIG. 4 is a diagram illustrating an operation sequence of a wireless charging system. In the present exemplary embodiment, a user uses electronic money payment and the NFC function of the RX 101 is activated.

First of all, the user of the RX 101 brings the RX 101 closer to the power transmission apparatus 102 to charge the RX 101. Specifically, the user places the RX 101 on the TX 102.

In S401, the TX 102 always performs NFC device detection processing for preventing damages to an NFC tag. In other words, by the detection processing, it is possible to detect the existence of a device having an activated NFC function in addition to an NFC tag. The processing is periodically executed by timer control. Thus, if the RX 101 having the activated NFC function is brought closer to the TX 102, in S402, the TX 102 detects that an NFC device exists nearby. In the detection processing, the TX 102 transmits carrier waves. If the NFC device makes a response upon receipt of the carrier waves, the TX 102 detects the existence of the NFC device. The TX 102 executes the processing as polling processing. The detection processing may be irregularly executed.

In the processing related to the power transmission and reception, first of all, the TX 102 performs object detection processing and detection processing of the RX 101. Specifically, in S403, the TX 102 repeatedly and intermittently transmits an Analog Ping of the WPC standard via the power transmission antenna 303. Then, the TX 102 detects a voltage value or a current value of the power transmission antenna 303 at the time of transmission of the Analog Ping, and determines that an object exists near the power transmission antenna 303, if the voltage value falls below a certain threshold or if the current value exceeds a certain threshold. The TX 102 then shifts to the Ping Phase.

In the Ping Phase, in S404, the TX 102 transmits a Digital Ping having larger power than the Analog Ping. The Digital Ping has power large enough for activating at least the control unit 201 of the RX 101 that exists near the power transmission antenna 303.

If the control unit 201 of the RX 101 is activated by the power (Digital Ping) received via the power receiving antenna 203, then in S405, the control unit 201 recognizes that the TX 102 exists nearby. Then, if the RX 101 is detected by the TX 102 as an NFC device, then in S406, the control unit 201 deactivates the NFC function of the RX 101 to prevent power transmission from being restricted.

For deactivating the NFC function, it is considered to return no response in the NFC device detection processing performed by the TX 102 in S401, or to stop power supply to the NFC unit 210 from the power source unit 202. In addition, a message for requesting the user to deactivate the NFC function may be displayed on the UI included in the smartphone function processing unit 204, and the NFC function may be deactivated in accordance with an instruction from the user. For charging processing, the RX 101 executes processing of preventing the user from activating the NFC function via the UI. This is because, unless the foregoing processing is performed, the user can activate the NFC function during charging. As a result, the TX 102 detects a device having an activated NFC function and restricts power transmission. If power to be supplied from the TX 102 is restricted, charging of the RX 101 may fail or a charging time may become longer. To avoid such a situation, UI display for preventing the NFC function from being activated may be presented during charging via the smartphone function processing unit 204.

If the RX 101 detects the Digital Ping, then in S407, the RX 101 notifies a Signal Strength Packet (received voltage value) to the TX 102. Then, the RX 101 shifts to the I&C Phase. The notification of the Signal Strength Packet is communicated via the WPC communication unit 205 and the WPC communication unit 304. If the TX 102 receives the notification of the Signal Strength Packet, the TX 102 shifts to the I&C Phase.

In the I&C Phase, in S408, the RX 101 transmits an Identification (ID) Packet to the TX 102. The ID Packet includes, in addition to a manufacturer code and a basic device ID which serve as identification information unique to the RX 101, an information element that can identify the version of the WPC standard that the RX 101 is compliant with. In S409, the RX 101 further transmits a Configuration Packet to the TX 102. The Configuration Packet includes the following information as capability information of the RX 101. More specifically, the capability information includes a maximum power value that is a value for identifying the maximum power that can be supplied by the RX 101 to the load, and information indicating whether a negotiation function of the WPC standard is included.

If the TX 102 receives these packets, the TX 102 checks whether the RX 101 includes the negotiation function. If the RX 101 includes the negotiation function, then in S410, the TX 102 transmits an ACK. Then, the TX 102 shifts to the Negotiation Phase. If the RX 101 receives the ACK in S410, the RX 101 shifts to the Negotiation Phase.

In the Negotiation Phase, the TX 102 and the RX 101 perform negotiation for determining the above-described GP. Specifically, the RX 101 notifies a candidate value of GP using a Specific Request Packet. The TX 102 accepts or refuses the notification. In this example, because the RX 101 has the capability to output power of 15 watts to the charging unit 208, in S411, the RX 101 notifies the maximum power of 15 watts as a candidate value of GP. The RX 101 waits for reception of a positive acknowledge (ACK) or a negative acknowledge (NACK) from the TX 102.

Since the transmission of high output power can possibly damage an NFC tag, the TX 102 has a threshold of a power value at which an NFC tag is not damaged. In this example, the threshold value is defined to be 6 watts, but the threshold value is not limited to this. In S402, the TX 102 that has received the Specific Request Packet detects the existence of an NFC device using the NFC unit 307. However, because it is difficult to determine whether the detected NFC device is an NFC tag or a device having an activated NFC function, the TX 102 determines that the power transmission of 15 watts can possibly damage an NFC tag if the detected NFC device is an NFC tag. Thus, in S412, the TX 102 transmits an NACK in response to the notification of the Specific Request Packet indicating the power value is equal to or larger than the threshold.

If the RX 101 does not receive an ACK but receives a NACK, the RX 101 determines that the TX 102 has not detected that the NFC function of the RX 101 has been deactivated. Thus, in S415, the RX 101 notifies again 15 watts as the value of GP.

On the other hand, if the above-described periodical NFC tag detection processing is executed in S413, then in S414, the TX 102 detects that no NFC device exists near the TX 102. In other words, the detection in this means that the deactivation of the NFC function of the RX 101 is detected. Thus, because the TX 102 can accept the maximum power of 15 watts as a value of GP, in S416, the TX 102 returns an ACK in response to a re-request for power transmission of 15 watts which is made by the RX 101 in S415. Then, reception of power of 15 watts is determined.

After the reception of power of 15 watts is determined, in S417, the TX 102 and the RX 101 shift to the Calibration Phase. In the Calibration Phase, the TX 102 determines a parameter required for a foreign substance detection function of detecting that an object other than the RX 101 exists near a power transmission antenna 303, which will not be described in detail.

After that, in S418, the TX 102 and the RX 101 shift to the Power Transfer Phase, and the RX 101 starts charging of the battery 209. During the charging, the TX 102 and the RX 101 continuously perform control communication that is based on the WPC standard, via the WPC communication unit 205 and the WPC communication unit 304.

If the RX 101 ends the charging, in S419, the RX 101 transmits an End Power Transfer Packet to the TX 102. The TX 102 that has received the packet stops power supply to the RX 101.

If the RX 101 ends the charging, then in S420, the RX 101 activates the NFC function of the RX 101 and brings an application that uses the NFC function into an effective state.

As described above, the RX 101 according to the present exemplary embodiment deactivates the NFC function of the RX 101 by detecting the existence of the TX 102. The RX 101 accordingly can receive appropriate power from a power transmission apparatus equipped with an NFC tag detection function, and the impairment of user-friendliness can be prevented.

In the present exemplary embodiment, if both of the RX 101 and an NFC tag are placed on the charging stand of the TX 102, the NFC tag is detected by the NFC tag detection processing of the TX 102. The power transmission is thus restricted so as not to damage the NFC tag. Even if an NFC tag is attached to the RX 101, a similar effect can be obtained.

A method in which an RX detects the existence of a TX is not limited to the method in which a Digital Ping is received by a WPC communication unit. For example, a mechanical switch provided on the RX may be turned ON by a trigger provided on a charging surface of a charging stand of the TX when the RX is placed thereon. The RX may detect the TX by detecting a specific physical amount (e.g., current or voltage of the RX 101).

(Flow of Processing of Power Receiving Apparatus)

Next, an operation procedure of the RX 101 and the TX 102 according to the present exemplary embodiment will be described with reference to FIGS. 5A and 5B (hereinafter collectively referred to as FIG. 5).

Figure 5:
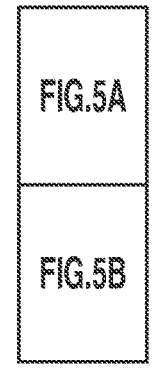
FIG. 5, consisting of FIGS. 5A and 5B, is a flowchart illustrating an operation of the power receiving apparatus according to the first exemplary embodiment.
Figure 5A:
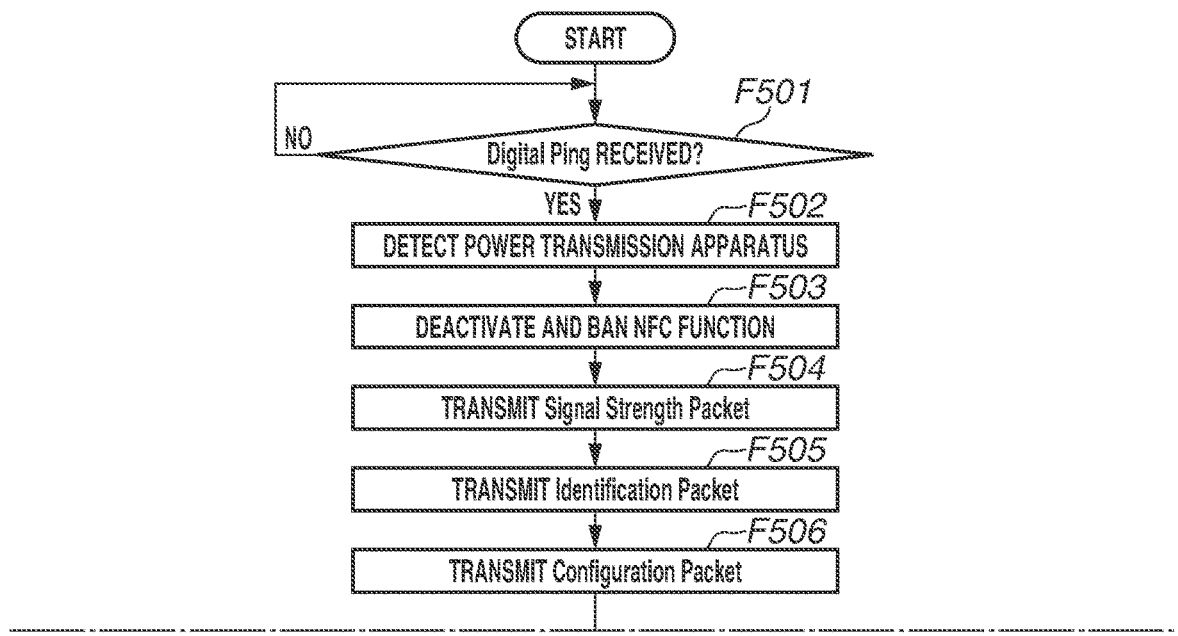
Figure 5B:
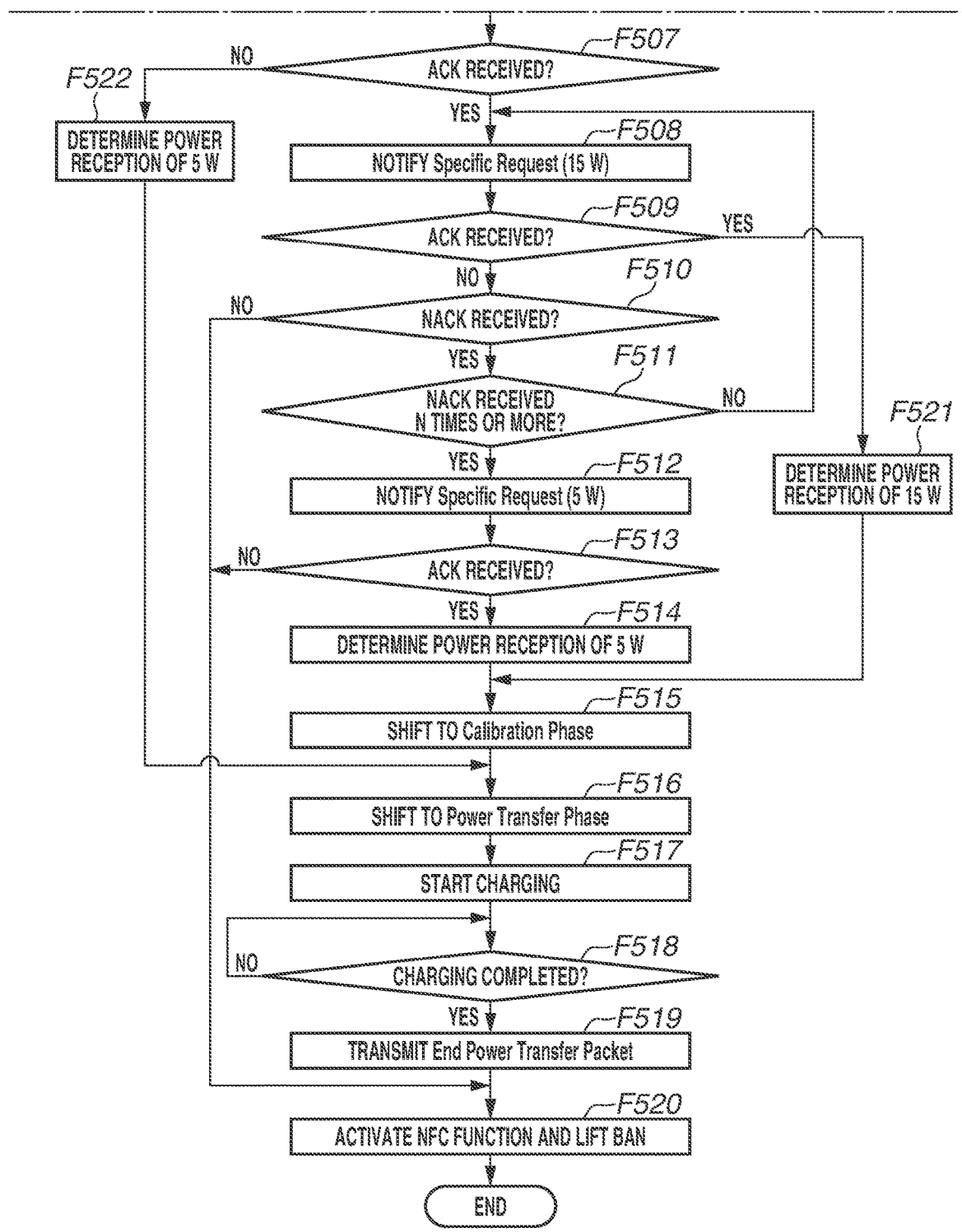

FIG. 5 is a flowchart illustrating an example of a flow of processing executed by the RX 101. The processing can be implemented by the control unit 201 of the RX 101 executing a program read from the storage unit 206, for example. At least part of the following procedure may be implemented by hardware. The hardware in this case can be implemented, for example, by automatically generating a dedicated communication circuit that uses a gate array circuit, such as an FPGA, from a program for implementing each processing operation, using a predetermined compiler. The processing can be executed if the power of the RX 101 is turned on, if the RX 101 is activated by power supply from the battery 209 or the TX 102, or if the user of the RX 101 inputs a start instruction of a wireless charging application. In addition, the processing may be started in response to another trigger.

First of all, in F501, the RX 101 determines whether a Digital Ping is received. If the RX 101 is activated by power (Digital Ping) received via the power receiving antenna 203 (YES in F501), then in F502, the control unit 201 of the RX 101 recognizes that the TX 102 exists nearby. In F503, the control unit 201 deactivates the NFC function of the RX 101 for preventing the RX 101 from being detected by the TX 102 as a device having an activated NFC function, and preventing power transmission from being restricted. A method of deactivating the NFC function is as described above.

If the RX 101 detects the Digital Ping, then in F504, the RX 101 notifies a Signal Strength Packet (received voltage value) to the TX 102. Then, the RX 101 shifts to the I&C Phase. The notification of the Signal Strength Packet is communicated via the WPC communication unit 205 and the WPC communication unit 304.

In the I&C Phase, in F505 and F506, the RX 101 transmits an ID Packet and a Configuration Packet to the TX 102.

In F507, the RX 101 determines whether an ACK is received. If the RX 101 receives an ACK from the TX 102 (YES in F507), the RX 101 shifts to the Negotiation Phase. If the RX 101 does not receive an ACK (NO in F507), the RX 101 determines that the TX 102 does not include the negotiation function. In F522, reception of power of 5 watts is determined.

In the Negotiation Phase, the TX 102 and the RX 101 negotiate to determine the above-described value of GP. Specifically, the RX 101 notifies a candidate value of GP using a Specific Request Packet. In this example, because the RX 101 has the capability to output power of 15 watts to the charging unit 208, in F508, the RX 101 notifies the maximum power of 15 watts as a candidate value of GP. The RX 101 waits for reception of a positive acknowledge (ACK) or a negative acknowledge (NACK) from the TX 102.

In F509, the RX 101 determines whether an ACK is received. If the RX 101 receives an ACK as a response of the TX 102 (YES in F509), the processing proceeds to F521. In F521, reception of power of 15 watts is determined. In F510, the RX 101 determines whether a NACK is received. If the RX 101 receives neither an ACK nor a NACK (NO in F509 and NO in F510), it is determined that power cannot be received from the TX 102, and the processing is ended. In this case, in F520, the RX 101 activates the NFC function of the RX 101 and brings an application that uses the NFC function into an effective state. Then, the RX 101 ends the processing.

If the RX 101 does not receive an ACK but receives an NACK (NO in F509 and YES in F510), the RX 101 determines that the TX 102 has not detected the deactivation of the NFC function of the RX 101. The processing proceeds to F511. In F511, the RX 101 determines whether a NACK is received a certain fixed number of times or more. If the RX 101 has not received an NACK the certain fixed number of times or more (NO in F511), then in F508, the RX 101 notifies again 15 watts as GP.

If the RX 101 has received a NACK the certain fixed number of times or more (YES in F511), the RX 101 determines that the TX 102 cannot transmit with a power of 15 watts for some reasons. In F512, the RX 101 requests power reception of 5 watts from the TX 102 as a candidate value of GP. In F513, the RX 101 determines whether an ACK is received from the TX 102 as a response to the request. If the RX 101 receives an ACK from the TX 102 as a response to the request (YES in F513), then in F514, reception of power of 5 watts is determined. If the RX 101 does not receive an ACK (NO in F513), it is determined that power cannot be received from the TX 102, the processing is ended.

The specific reason why the TX 102 cannot transmit with a power of 15 watts is that an NFC tag is detected or a device having an activated NFC function exists. By receiving a NACK the certain fixed number of times or more after deactivating the NFC unit 210 of the RX 101, the RX 101 can determine that the TX 102 has detected an NFC tag or a device having an activated NFC function. Then, in F514, a transmission of power of 5 watts, which is a power that does not affect an NFC tag, is determined.

After the RX 101 notifies again 15 watt as GP, if the RX 101 receives an ACK (YES in F509), then in F521, a reception of power of 15 watts is determined.

After the reception of power of 15 watts is determined, then in F515, the RX 101 shifts to the Calibration Phase. In F516, the RX 101 shifts to the Power Transfer Phase, and in F517, the RX 101 starts charging of the battery 209.

In F518, the RX 101 determines whether the charging is completed. If the RX 101 ends the charging (YES in F518), then in F519, the RX 101 transmits an End Power Transfer Packet to the TX 102. If the RX 101 ends the charging, in F520, the RX 101 activates the NFC function of the RX 101 and brings an application that uses the NFC function into an effective state.

(Flow of Power Transmission Processing of Power Transmission Apparatus)

Next, an operation procedure of power transmission processing of the TX 102 according to the present exemplary embodiment will be described with reference to FIG. 8.

Figure 8:
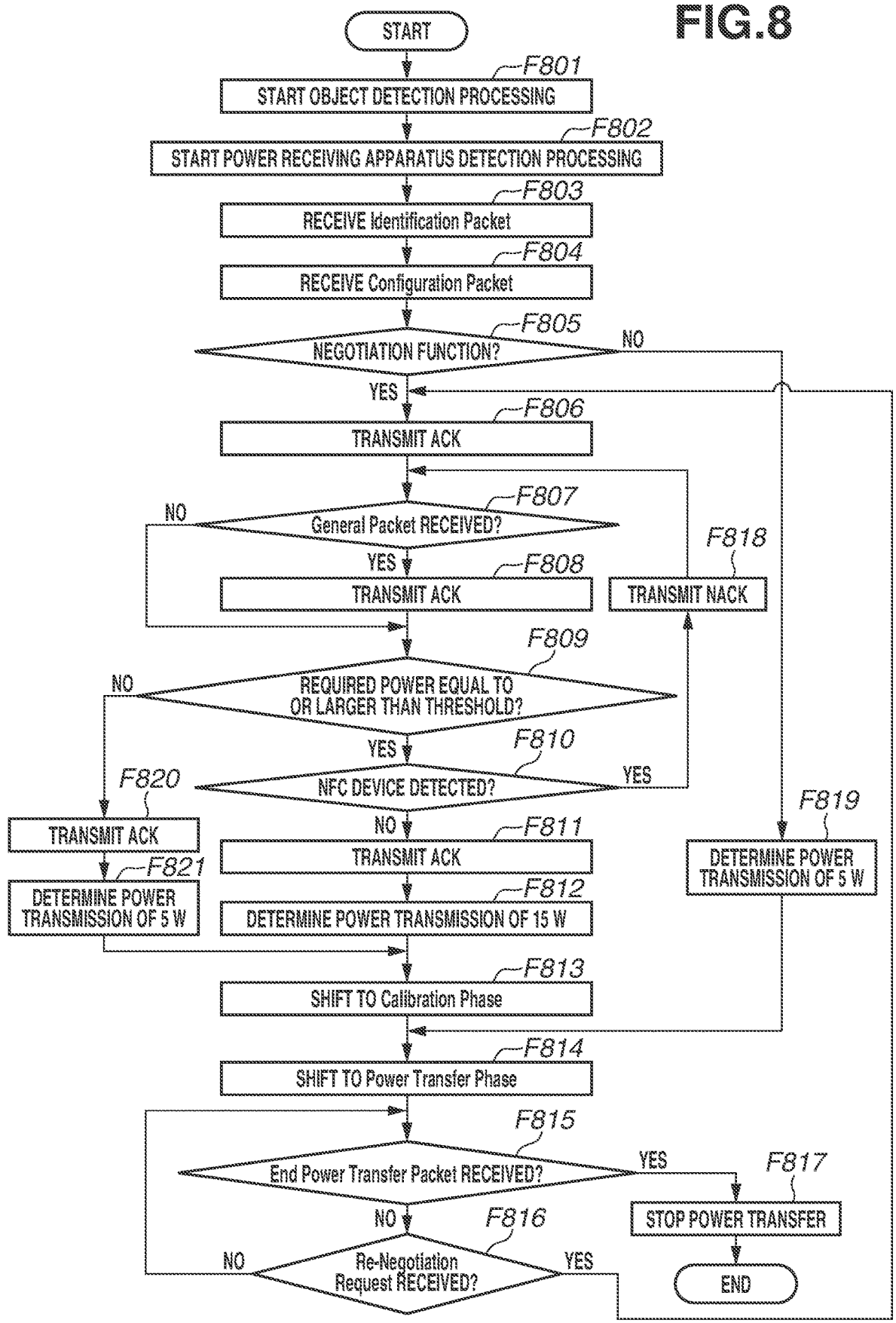
FIG. 8 is a flowchart illustrating an operation of each of a power transmission apparatus according to the first exemplary embodiment and a power transmission apparatus according to the second exemplary embodiment.

FIG. 8 is a flowchart illustrating an example of a flow of processing executed by the TX 102. The processing can be implemented by the control unit 301 of the TX 102 executing a program read from the storage unit 305, for example. At least part of the following procedure may be implemented by hardware. The hardware in this case can be implemented, for example, by automatically generating a dedicated communication circuit that uses a gate array circuit, such as an FPGA, from a program for implementing each processing operation, using a predetermined compiler. The processing can be executed if power of the TX 102 is turned on, if the user of the TX 102 inputs a start instruction of a wireless charging application, or if the TX 102 is connected to a commercial power source and supplied with power. In addition, the processing may be started in response to another trigger.

In the power transmission processing, first of all, in F801, the TX 102 performs object detection processing. In F802, the TX 102 performs detection processing for detecting the RX 101. Specifically, the TX 102 repeatedly and intermittently transmits an Analog Ping of the WPC standard via the power transmission antenna 303. Then, the TX 102 detects a voltage value or a current value of the power transmission antenna 303 that is obtainable when the Analog Ping is transmitted, and determines that an object exists near the power transmission antenna 303, if the voltage value falls below a certain threshold or if the current value exceeds a certain threshold. The TX 102 accordingly shifts to the Ping Phase. In the Ping Phase, the TX 102 transmits a Digital Ping having larger power than the Analog Ping. The Digital Ping has power large enough for activating at least the control unit 201 of the RX 101 that exists near the power transmission antenna 303.

If the TX 102 receives the notification of the Signal Strength Packet from the RX 101, the TX 102 shifts to the I&C Phase.

In the I&C Phase, in F803 and F804, the TX 102 receives an ID Packet and a Configuration Packet from the RX 101. If the TX 102 receives these packets, then in F805, the TX 102 checks whether the RX 101 includes the negotiation function. If the RX 101 includes the negotiation function (YES in F805), the processing proceeds to F806. In F806, the TX 102 transmits an ACK. Then, the TX 102 shifts to the Negotiation Phase.

On the other hand, if the TX 102 determines that the RX 101 does not include the negotiation function (NO in F805), then in F819, transmission of a power of 5 watts is determined.

In the Negotiation Phase, the TX 102 and the RX 101 negotiate to determine the above-described value of GP. The TX 102 waits for transmission of a Specific Request Packet or a General Packet from the RX 101.

In F807, the TX 102 determines whether a General Packet is received. If the TX 102 does not receive a General Packet (NO in F807) but receives a Specific Request Packet, the processing proceeds to F809. In F809, the TX 102 determines whether power required by the Packet is equal to or larger than a threshold. Since the transmission of high output power can possibly damage an NFC tag, the TX 102 has a threshold of a power value at which an NFC tag is not damaged. In this example, the threshold is defined to be 5 watts.

If the power required by the RX 101 is smaller than the threshold (NO in F809), then in F820, the TX 102 that has received the Specific Request Packet transmits an ACK to the RX 101. In F821, transmission of the required power (5 watts in this case) is determined.

On the other hand, if the power required by the RX 101 is equal to or larger than the threshold (YES in F809), then in F810, the TX 102 determines whether an NFC device is detected. For the determination, the TX 102 inquires of the NFC unit 307. Since the NFC unit 307 detects an NFC device (YES in F810), the TX 102 determines that transmission of power of 15 watts can possibly damage an NFC tag. Thus, in F818, the TX 102 transmits a NACK in response to the notification of the Specific Request Packet indicating the required power equal to or larger than the threshold. Then, the TX 102 waits again for transmission of a Specific Request Packet or a General Packet from the RX 101.

Meanwhile, if the above-described NFC device detection processing is periodically executed, the TX 102 stops detecting an NFC device near the TX 102 (NO in F810). The TX 102 thus can accept the maximum power of 15 watts as a value of GP. In F811, the TX 102 accordingly transmits an ACK in response to a re-request for transmission of power of 15 watts from the RX 101. Then, in F812, power transmission of 15 watt is determined.

After the required power or the power transmission of 15 watts is determined, in F813, the TX 102 shifts to the Calibration Phase. After that, in F814, the TX 102 shifts to the Power Transfer Phase.

In F815, the TX 102 determines whether an End Power Transfer Packet is received from the RX 101. If the TX 102 receives an End Power Transfer Packet from the RX 101 (YES in F815), then in F817, the TX 102 stops power transfer to the RX 101.

In the present exemplary embodiment described above, the description has been given using an example case where the NFC function is activated in the RX 101. The present exemplary embodiment is, however, not limited to this. For example, even if the NFC function is deactivated in the RX 101, a similar effect can be obtained by controlling the RX 101 so as to ban the activation of the NFC function when the existence of the TX 102 is detected. The control may be performed by a method in which the user disables the activation of an NFC function using a UI, or may be performed by a method of disabling operations on the RX 101, for example.

In addition, in place of the processing in F511 of FIG. 5, the RX 101 may perform processing for measuring a time from when an ACK is received in F507, and comparing the measured time and a threshold, for example. In this case, if the measured time is equal to or smaller than the threshold, the processing in F508 may be performed again, and if the measured time exceeds the threshold, the processing may proceed to the processing in F512 and subsequent operations.

In addition, the description has been given using an example in which the NFC device detection processing (S401) is performed by the TX 102 prior to the transmission of the Analog Ping (S403), but the present exemplary embodiment is not limited to this. For example, the NFC device detection processing (S401) may be performed after the transmission of the Analog Ping or the transmission of the Digital Ping (S404).

In the present exemplary embodiment, the description has been given using NFC as an example, but communication is not limited to this. For example, even in a case where the RX 101 includes a communication function of emulating a tag that performs communication other than NFC and can be damaged by the transmission of high power, the present exemplary embodiment can be applied.

Hereinafter, a second exemplary embodiment will be described. In the first exemplary embodiment, the description has been given of a configuration in which transmission of power of 15 watts is re-requested even if the RX 101 receives a NACK as a response of the TX 102 to a power transmission request of 15 watts. In this case, it can possibly take time until the charging is started. In the present exemplary embodiment, a configuration of shortening a time until a charging start will be described.

Figure 6:
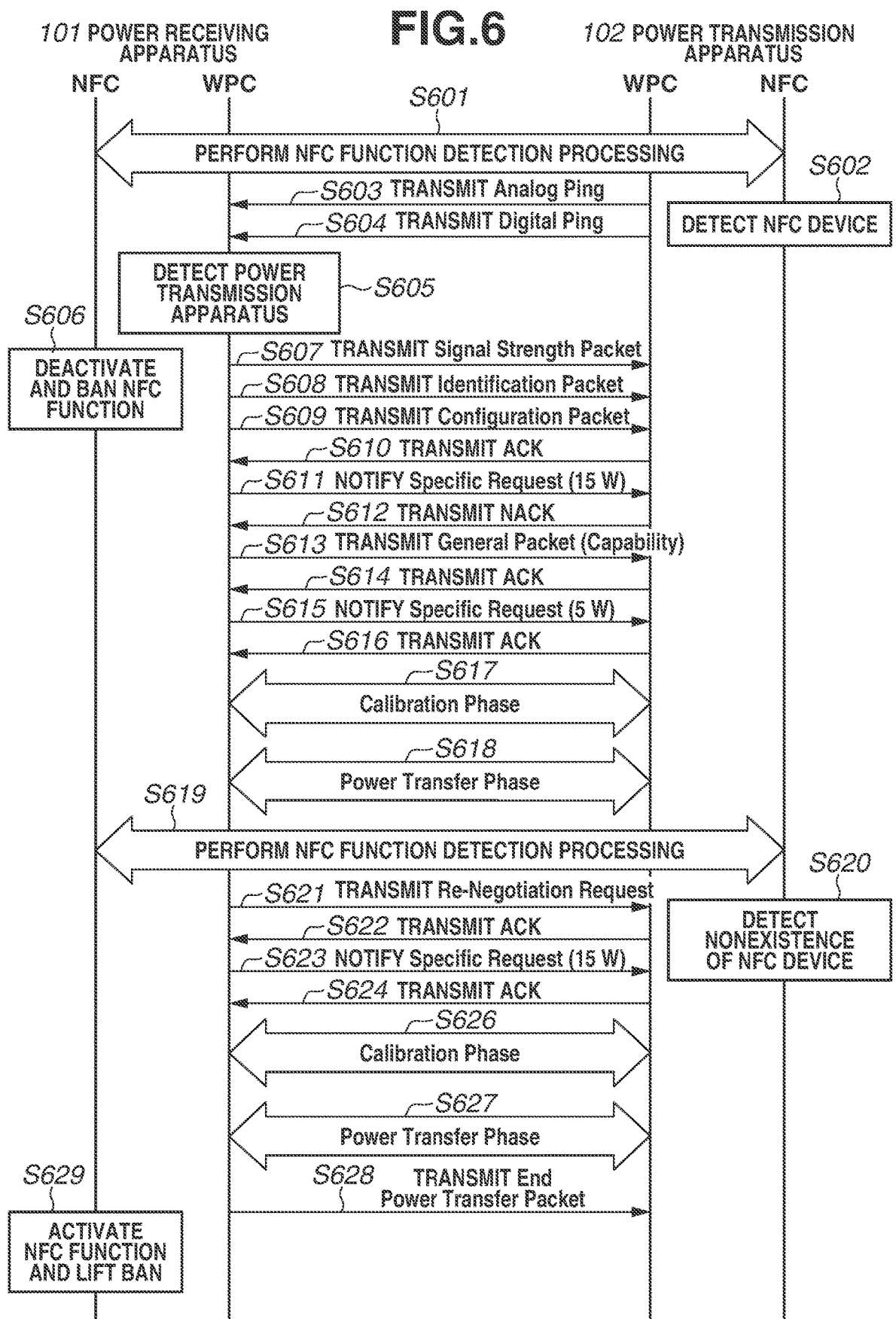
FIG. 6 is a diagram illustrating an operation sequence of a wireless charging system according to a second exemplary embodiment.
Figure 7:
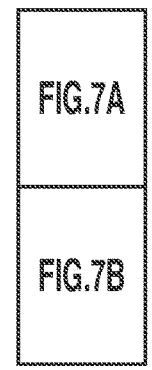
FIG. 7, consisting of FIGS. 7A and 7B, is a flowchart illustrating an operation of a power receiving apparatus according to the second exemplary embodiment.
Figure 7A:
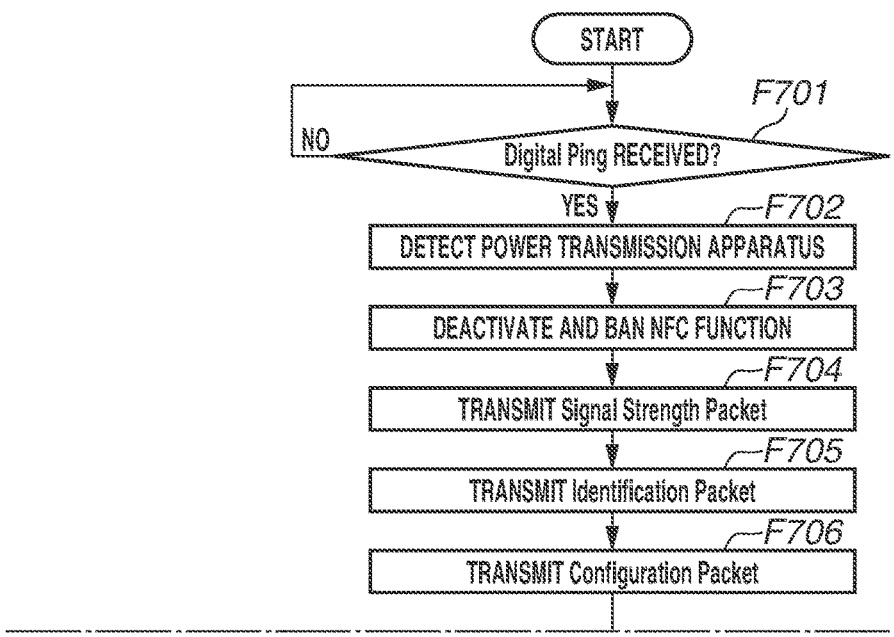
Figure 7B:
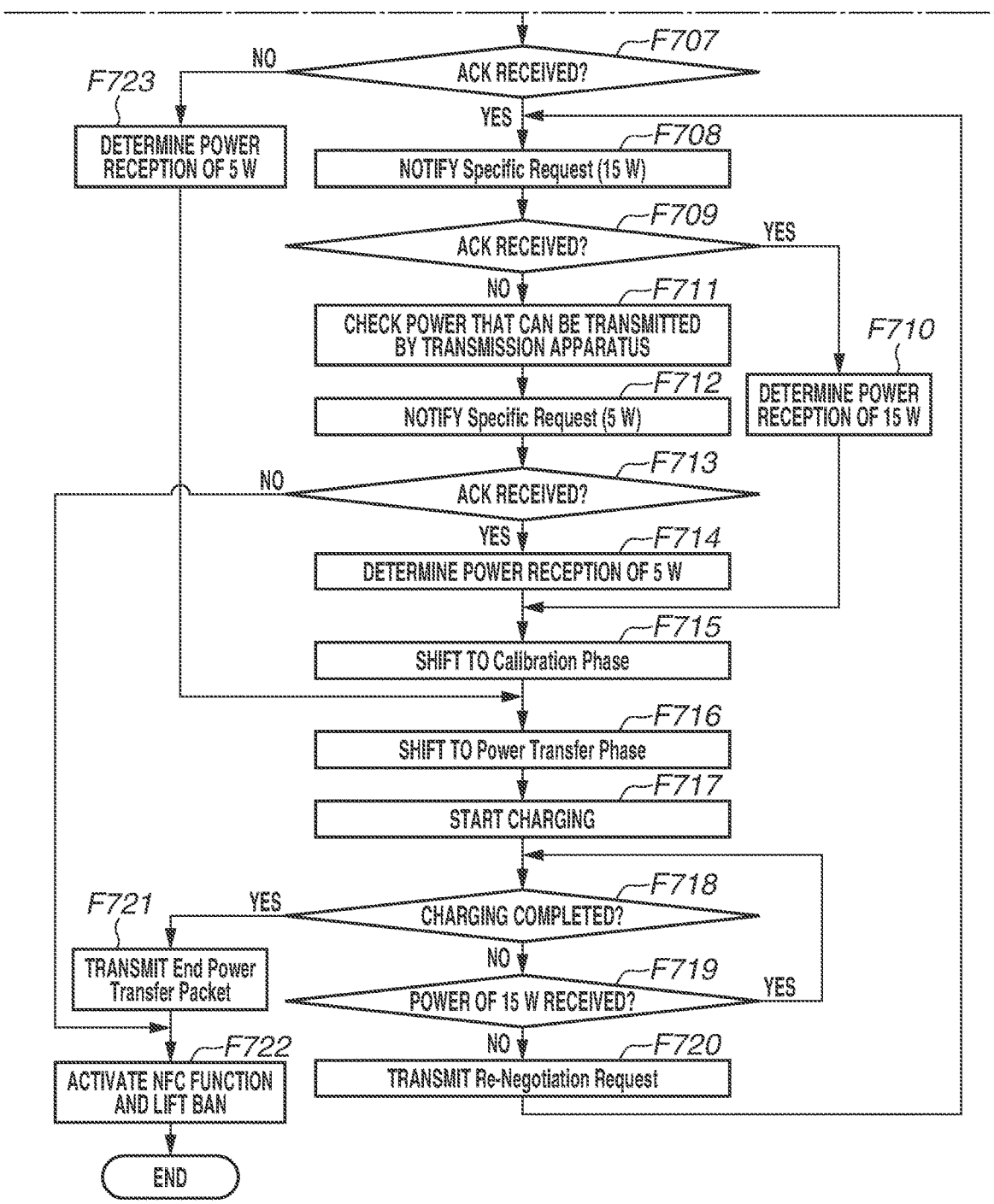

Since the configurations of a wireless charging system, a power receiving apparatus, and a power transmission apparatus according to the present exemplary embodiment are similar to those in the first exemplary embodiment, the description will be omitted. Hereinafter, an operation procedure of an RX 101 and a TX 102 according to the present exemplary embodiment will be described with reference to FIGS. 6 to 8. FIG. 6 is a diagram illustrating an operation sequence of the wireless charging system according to the present exemplary embodiment. FIG. 7, consisting of FIGS. 7A and 7B, is a flowchart illustrating an example of a flow of processing executed by the RX 101 according to the present exemplary embodiment. FIG. 8 is a flowchart illustrating an example of a flow of power transmission processing executed by the TX 102 according to the present exemplary embodiment.

Since processing in S601 to S612 in FIG. 6 is similar to the processing in S401 to S412 of FIG. 4, the description will be omitted. In the processing executed by the RX 101, since processing in F701 to in F710 of FIG. 7 is similar to the processing in F501 to F510 of FIG. 5, the description will be omitted.

If the TX 102 refuses transmission of power of 15 watts in S612 and F818 (NO in F709), then in S613, the RX 101 transmits a General Packet (Capability), and in F711, the RX 101 checks the power that the TX 102 can transmit.

If the TX 102 receives a General Packet (YES in F807), then in S614 and F808, the TX 102 returns an ACK as a response to the RX 101 because an NFC device is detected and the TX 102 sets 5 watts as the maximum power that can be transmitted. In response to the result, in S615 and F712, the RX 101 requests 5 watts from the TX 102 as a value of GP. Then, in S616 and F820, the TX 102 transmits an ACK.

In F713, the RX 101 determines whether the above-described ACK is received. The RX 101 receives the ACK (YES in F713), then in F714 and F812, a power reception (power transmission) of 5 watts is determined. If the negotiation of GP is ended, then in S617, F715, and F813, the TX 102 and the RX 101 shift to the Calibration Phase.

After that, in S618, F716, and F814, the TX 102 and the RX 101 shift to the Power Transfer Phase. In F717, the RX 101 starts charging of the battery 209.

Meanwhile, if the NFC device detection processing is periodically executed in S619, in S620, the TX 102 detects that no NFC device exists near the TX 102 (NO in F810). In other words, the deactivation of the NFC function of the RX 101 is detected.

In F718, the RX 101 determines whether the charging is completed. If the charging is not completed (NO in F718), then in F719, the RX 101 determines whether a power of 15 watts has been received. If a power of 15 watts has not been received (NO in F719), the RX 101 expects that a result obtained by the NFC device detection processing of the TX 102 has been updated, and in S621 and F720, the RX 101 transmits a Re-Negotiation Request to receive larger power.

In F816, the TX 102 determines whether the Re-Negotiation Request is received. If the TX 102 receives the request (YES in F816), in S622 and F806, the TX 102 transmits an ACK to the RX 101.

Then, the RX 101 and the TX 102 shift to a Re-Negotiation Phase. In the Re-Negotiation Phase, the TX 102 and the RX 101 perform re-negotiation of GP. In this case, since the RX 101 has the capability to supply power for outputting a power of 15 watts to the charging unit 208, in S623 and F708, the RX 101 notifies again the maximum power of 15 watts as a candidate value of GP.

On the other hand, by the periodical NFC device detection processing (S619), in S620 and F810, the TX 102 detects that no NFC device exists near the TX 102 (No in F810). Thus, the TX 102 that has received the Re-Negotiation Request and the Specific Request Packet can accept the maximum power of 15 watts as a value of GP. In other words, in S624 and F811, the TX 102 transmits an ACK in response to the re-request of power transmission of 15 watts from the RX 101 (YES in F709). Then, in S626 and S627, the RX 101 and the TX 102 shift to the Calibration Phase and the Power Transfer Phase.

Because processing performed in S628, S629, F721, and F722 after the completion of charging (YES in F718) is similar to the processing performed in S419, S420, F519, and F520 in the first exemplary embodiment, the description will be omitted.

As described above, the RX 101 according to the present exemplary embodiment deactivates the NFC function of the RX 101 by detecting the existence of the TX 102.

Thus, appropriate power can be received from the TX 102 equipped with an NFC device detection function, and the impairment of user-friendliness can be prevented. In addition, if the first power transmission request of 15 watts is refused, the RX 101 checks the maximum power that can be transmitted by the TX 102, and performs negotiation using the checked maximum power. With this configuration, it is possible to shorten a time until charging is started, as compared with the first exemplary embodiment. Then, by shifting to the Re-Negotiation Phase after the start of charging, it is possible to shorten a charging time as compared with a case where the phase does not shift to the Re-Negotiation Phase.

Hereinafter, a third exemplary embodiment will be described. In the present exemplary embodiment, unlike the above-described exemplary embodiments, the description will be given of a method in which an RX 101 confirms that a TX 102 enters a state of detecting no NFC device, and the RX 101 makes a power transmission request of 15 watts. Specifically, in the present exemplary embodiment, the RX 101 transmits a signal for inquiring of the TX 102 whether an NFC device is detected. The packet will be referred to as an NFC_Status_Request Packet in the present exemplary embodiment.

As a response to the packet, the TX 102 transmits at least a result (response signal) of NFC device detection processing to the RX 101. Specifically, the TX 102 transmits an ACK if an NFC device is detected, and transmits a NACK if no NFC device is detected.

Figure 9:
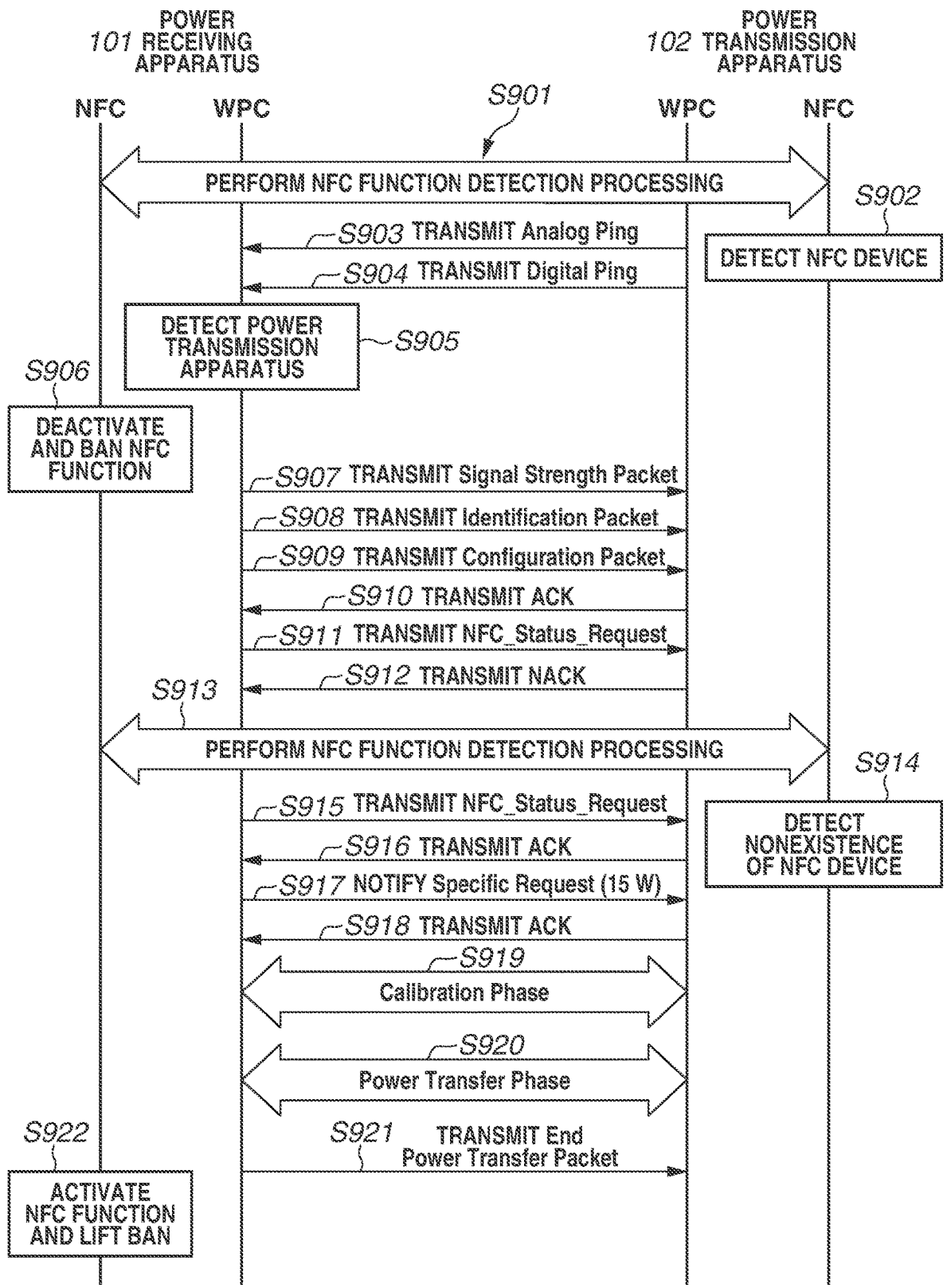
FIG. 9 is a diagram illustrating an operation sequence of a wireless charging system according to a third exemplary embodiment.
Figure 10:
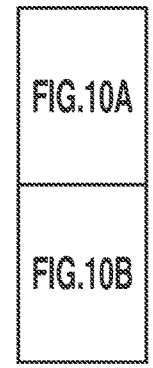
FIG. 10, consisting of FIGS. 10A and 10B, is a flowchart illustrating an operation of a power receiving apparatus according to the third exemplary embodiment.
Figure 10A:
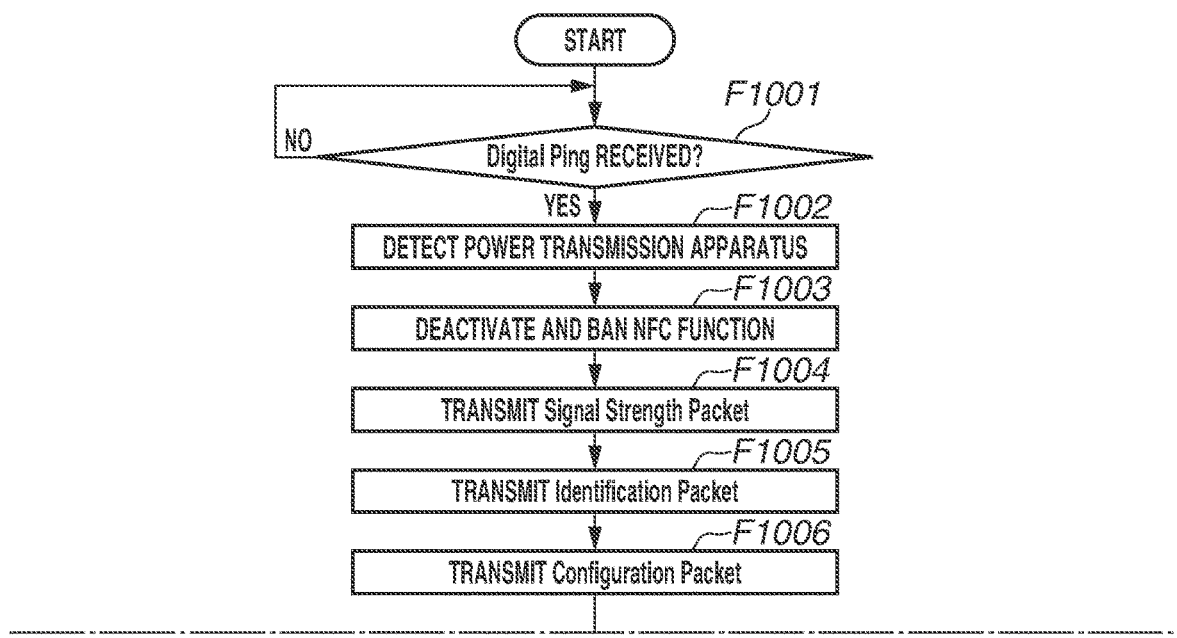
Figure 10B:
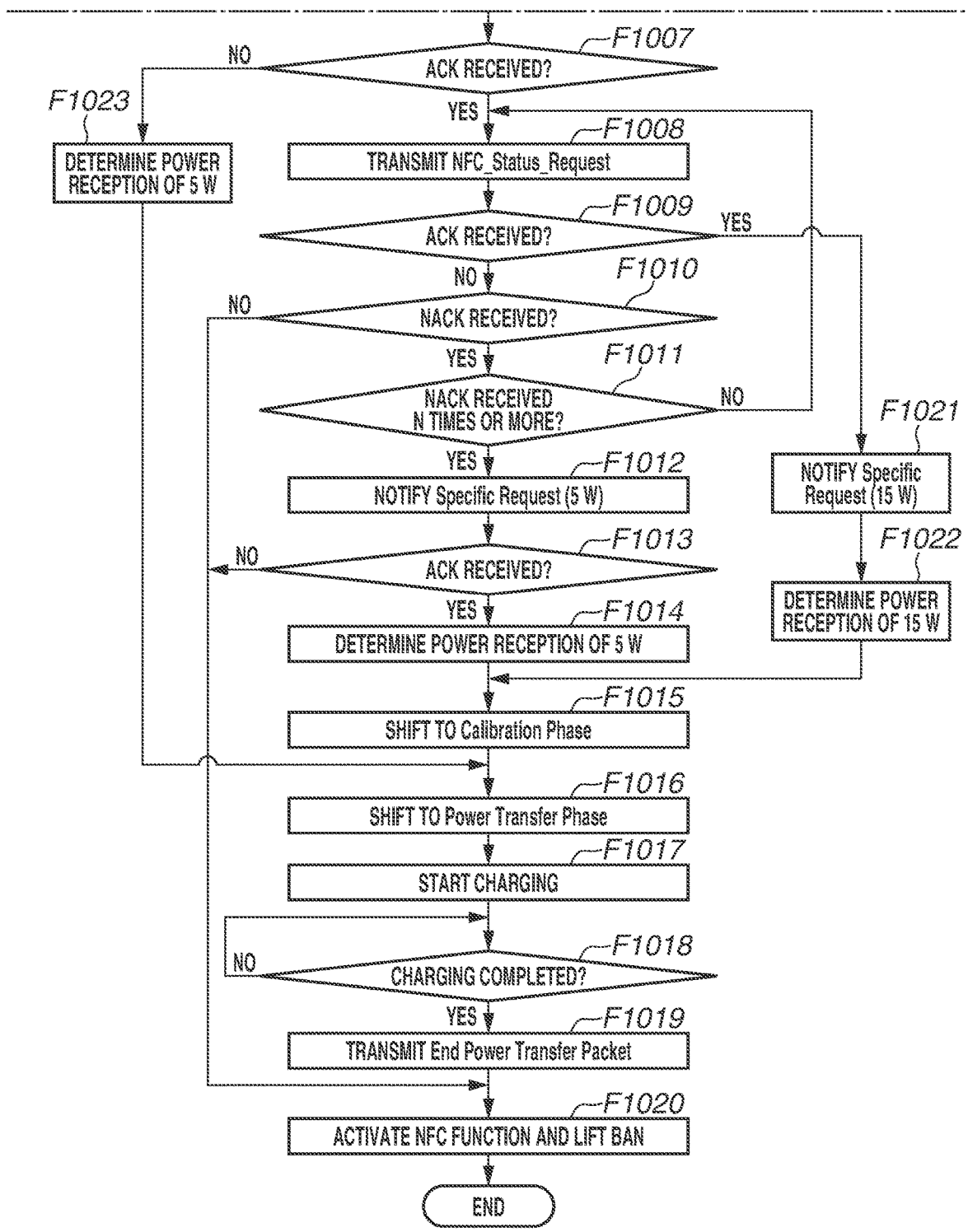
Figure 11:
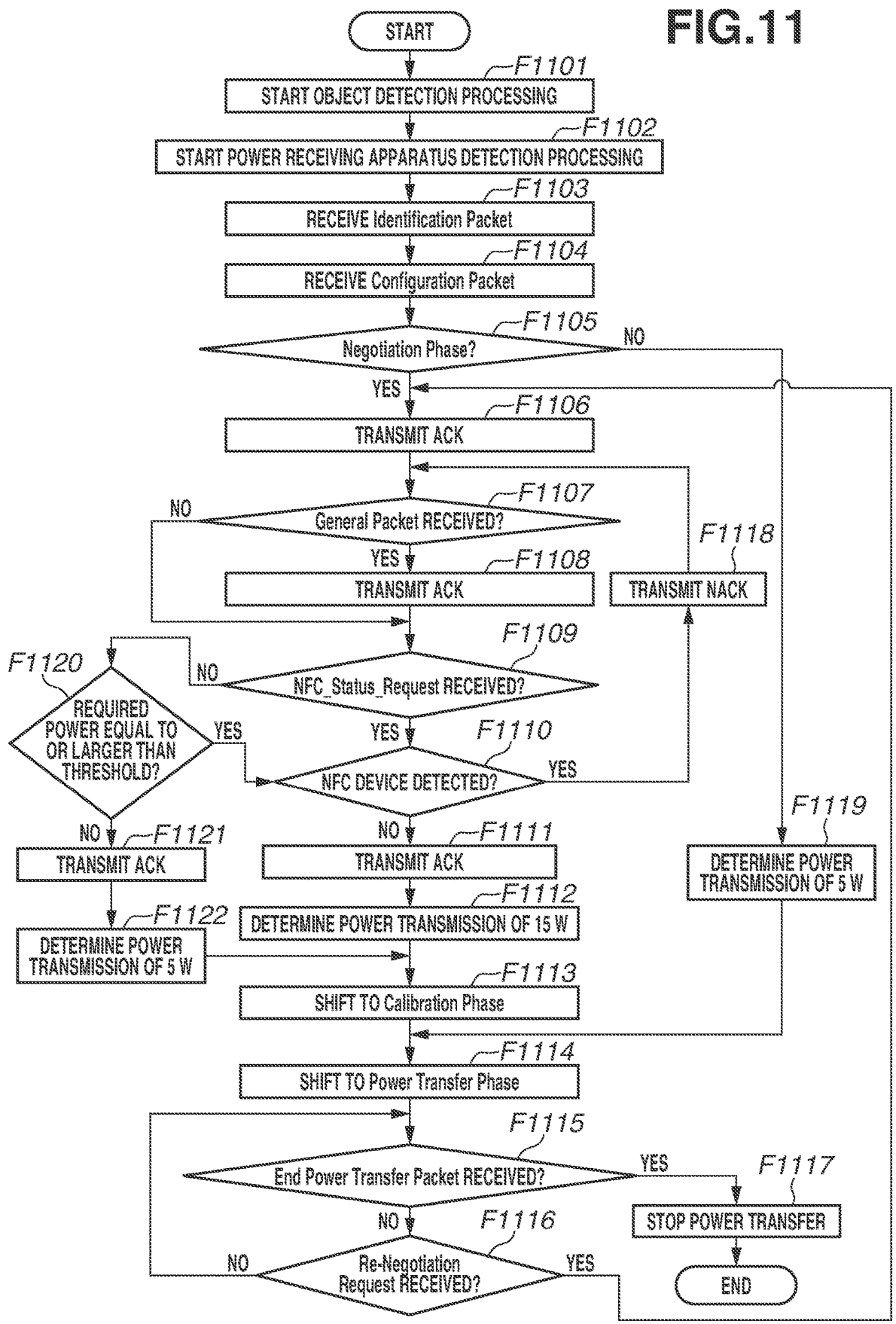
FIG. 11 is a flowchart illustrating an operation of a power transmission apparatus according to the third exemplary embodiment.

Hereinafter, an operation procedure of the RX 101 and the TX 102 according to the present exemplary embodiment will be described with reference to FIGS. 9 to 11. FIG. 9 is a diagram illustrating an operation sequence of a wireless charging system according to the present exemplary embodiment. FIG. 10, consisting of FIGS. 10A and 10B, is a flowchart illustrating an example of a flow of processing executed by the RX 101 according to the present exemplary embodiment. FIG. 11 is a flowchart illustrating an example of a flow of power transmission processing executed by the TX 102 according to the present exemplary embodiment. Since processing in S901 to S910 and S917 to S922 of FIG. 9 is the same as the processing in S401 to S410 and S415 to S420 of FIG. 4, the description will be omitted. Similarly, since processing in F1001 to F1007, F1013 to F1020, and F1023 of FIG. 10 is the same as the processing in F501 to F507, F513 to F520, and F522 of FIG. 5, the description will be omitted. Since processing in F1101 to F1108 and F1112 to F1119 of FIG. 11 is the same as the processing in F801 to F808 and F812 to F819 of FIG. 8, the description will be also omitted.

In S910, the RX 101 receives an ACK in response to the transmitted Configuration Packet (YES in F1007), and shifts to the Negotiation Phase. In S911 and F1008, the RX 101 transmits an NFC_Status_Request to the TX 102. If the RX 101 does not receive an ACK from the TX 102 as a response signal to the request (NO in F1009) and receives a NACK in S912 (YES in F1010), the following processing is performed. More specifically, until the RX 101 receives a NACK a predetermined number of times (N times) (NO in F1011), in F1008, the RX 101 transmits an NFC_Status_Request to the TX 102.

After that, if the TX 102 receives an NFC_Status_Request (YES in F1109), and if no NFC device is detected in S914 (NO in F1110) as a result of the NFC device detection processing (S913), the following processing is performed. More specifically, in S916 and F1111, the TX 102 transmits an ACK to the RX 101 as a response signal of the NFC_Status_Request.

If the RX 101 receives an ACK from the TX 102 in S916 (YES in F1009), the RX 101 determines that the TX 102 detects no NFC device. Then, in S917 and F1021, the RX 101 transmits a Specific Request (15 watts) to the TX 102. If the RX 101 receives an ACK from the TX 102 as a response to the request in S918, then in F1022, the reception of the maximum power of 15 watts is determined.

If the TX 102 does not receive an NFC_Status_Request (NO in F1109), the processing equivalent to the processing in F809 and subsequent of FIG. 8 is performed. Specifically, in F1120, the TX 102 determines whether required power is equal to or larger than a threshold. Then, if the required power is equal to or larger than the threshold (YES in F1120), then in F1110, the TX 102 determines whether an NFC device is detected. On the other hand, if the required power is smaller than the threshold (NO in F1120), then in F1121, the TX 102 transmits an ACK to the RX 101. Then, in F1122, the transmission of required power (5 watts in this case) is determined.

As described above, the RX 101 according to the present exemplary embodiment determines that the TX 102 enters a state of detecting no NFC device, based on the response to the NFC_Status_Request. With this configuration, in accordance with the response to NFC_Status_Request, a Specific Request (15 watt) can be transmitted at an appropriate timing and the Specific Request can be permitted. In other words, the TX 102 can also perform high-output power transmission processing with respect to the RX 101 equipped with an NFC unit operating in the card emulation mode.

The response to the NFC_Status_Request needs not be an ACK or a NACK. Specifically, the response may include at least an NFC tag detection bit, and may indicate that the TX 102 detects an NFC tag (or a device having an activated NFC function), if the NFC tag detection bit is 1. The response may indicate that the TX 102 does not detect an NFC tag (or a device having an activated NFC function), if the NFC tag detection bit is 0.

A packet in a General Request defined in the WPC standard v1.2.3 may be used for the NFC_Status_Request. For example, in the General Request, a Reserved Packet or a Proprietary Packet of which Packet type is undefined may be defined as an NFC_Status_Request.

A packet in a Specific Request defined in the WPC standard v1.2.3 may be used for the NFC_Status_Request. For example, in the Specific Request, a Reserved Packet or a Proprietary Packet of which Packet type is undefined may be defined as an NFC_Status_Request.

In addition, the NFC_Status_Request needs not be a Specific Request or a General Request as long as the packet is defined in the WPC standard v1.2.3.

Further, the NFC_Status_Request may be a packet that can be transmitted by the RX 101 in the Negotiation Phase or subsequent phases. Specifically, the NFC_Status_Request may be a packet that can be transmitted in the Negotiation Phase, the Power Transfer Phase, the Calibration Phase, or the Re-Negotiation Phase. Thus, if the TX 102 receives the packet in, for example, the Ping Phase or the Identification & Configuration phase that is not included in these phases, power transmission or control communication for power transmission may be stopped. Specifically, if the TX 102 receives not a Signal Strength Packet but an NFC_Status_Request in S907, the TX 102 stops power transmission or control communication for power transmission. Similarly, if the TX 102 receives an NFC_Status_Request in any of S907 to S909, the TX 102 stops power transmission or control communication for power transmission. With this configuration, if a packet of an NFC_Status_Request is received in a phase other than a predetermined phase, it is possible to detect a malfunction of the RX 101 and stop power transmission or control communication for power transmission.

<Other Exemplary Embodiments>

Some embodiments can also be implemented by processing of supplying a program for implementing one or more functions of the above-described exemplary embodiments, to a system or an apparatus via a network or a storage medium, and reading and executing the program by one or more processors in a computer of the system or the apparatus. In addition, some embodiments can also be implemented by a circuit (e.g., ASIC) that implements one or more functions.

In addition, at least part of the processing illustrated in the flowchart in FIG. 5, 7, 8, 10, or 11 may be implemented by hardware. In the case of implementing the processing by hardware, for example, with use of a predetermined compiler, the processing can be implemented by automatically generating a dedicated communication circuit on an FPGA from a program for implementing each processing. In addition, similarly to an FPGA, a gate array circuit may be formed and implemented as hardware.

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to some embodiments, a power receiving apparatus that can execute communication based on a standard of NFC can appropriately receive power.

While the present disclosure has described exemplary embodiments, it is to be understood that various embodiments are not limited to the disclosed exemplary embodiments. Also, the scope of the following claims is to be accorded the broadest interpretation so as to encompass all such modifications and equivalent structures and functions.

What is claimed is:

1. A power transmission apparatus comprising:
a power transmitting unit configured to wirelessly transmit power to a power receiving apparatus including:
a power receiving unit configured to wirelessly receive power from a power transmission apparatus;
a first communication unit configured to perform communication that is based on a standard of Near Field Communication (NFC);
a control unit configured to control the first communication unit not to perform the communication that is based on the standard of NFC; and
a second communication unit configured to transmit, to the power transmission apparatus, a signal for requesting a result of a detection of an object performing the communication that is based on the standard of NFC, after the second communication unit receives a signal for specifying that the power transmission apparatus detects the object performing the communication that is based on the standard of NFC and after the control unit controls the first communication unit not to perform the communication that is based on the standard of NFC;
a detection unit configured to detect an object performing communication that is based on the standard of NFC; and
a third communication unit configured to transmit a signal including information representing a result of the detection of the object in response to the signal for the requesting the result of the detection of the object from the power receiving apparatus.

2. The power transmission apparatus according to claim 1, wherein the signal for the requesting the result of the detection of the object is a general request defined in a standard of Wireless Power Consortium (WPC).

3. The power transmission apparatus according to claim 1, wherein the signal for the requesting the result of the detection of the object is a specific request defined in a standard of WPC.

4. The power transmission apparatus according to claim 1, wherein the information representing that the object performing the communication that is based on the standard of NFC is detected is "1", and the information representing that the object performing the communication that is based on the standard of NFC is not detected is "0".

5. The power transmission apparatus according to claim 1, wherein, in a case where the object performing the communication that is based on the standard of NFC is not detected, the third communication unit transmits an ACK as the signal.

6. The power transmission apparatus according to claim 1, wherein, in a case where the object performing the communication that is based on the standard of NFC is detected, the third communication unit transmits a NACK as the signal.

7. A power receiving apparatus comprising:
a power receiving unit configured to wirelessly receive power from a power transmission apparatus;
a first communication unit configured to perform communication that is based on a standard of Near Field Communication (NFC);
a control unit configured to control the first communication unit not to perform the communication that is based on the standard of NFC; and
a second communication unit configured to transmit, to the power transmission apparatus, a signal for requesting a result of a detection of an object performing the communication that is based on the standard of NFC, after the second communication unit receives a signal for specifying that the power transmission apparatus detects the object performing the communication that is based on the standard of NFC and after the control unit controls the first communication unit not to perform the communication that is based on the standard of NFC.

8. The power receiving apparatus according to claim 7, wherein the control unit controls the first communication unit not to perform the communication that is based on the standard of NFC, in a case where the power receiving unit receives the power from the power transmission apparatus.

9. The power receiving apparatus according to claim 7, wherein the control unit controls the first communication unit not to perform the communication that is based on the standard of NFC, in a case where the power receiving unit receives a Digital Ping that is based on a standard of Wireless Power Consortium.

10. The power receiving apparatus according to claim 7, wherein the control unit controls the first communication unit not to respond to polling, from the power transmission apparatus, that is based on the standard of NFC.

11. The power receiving apparatus according to claim 7, further comprising a power supply unit configured to control power supply to the first communication unit,
wherein the control unit controls the power supply unit not to supply power to the first communication unit.

12. The power receiving apparatus according to claim 7, wherein the signal is a general request defined in a standard of Wireless Power Consortium (WPC).

13. The power receiving apparatus according to claim 7, wherein the signal is a specific request defined in a standard of Wireless Power Consortium (WPC).

14. The power receiving apparatus according to claim 7, wherein the second communication unit receives, in response to the signal, a response signal including information representing a result of the detection of the object performing the communication that is based on the standard of NFC.

15. The power receiving apparatus according to claim 14, wherein the information representing that the object performing the communication that is based on the standard of NFC is detected is "1", and the information representing that the object performing the communication that is based on the standard of NFC is not detected is "0".

16. The power receiving apparatus according to claim 7, wherein, in a case where the object performing the communication that is based on the standard of NFC is not detected, the second communication unit receives an ACK as the response signal.

17. The power receiving apparatus according to claim 7, wherein, in a case where the object performing the communication that is based on the standard of NFC is detected, the second communication unit receives a NACK as the response signal.

18. The power receiving apparatus according to claim 7, wherein the control unit restrict a required power in a case where the power transmission apparatus detects the object that performs the communication that is based on the standard of NFC and is different from the power receiving apparatus.

19. The power receiving apparatus according to claim 7, wherein the control unit does not restrict a required power in a case where the second communication unit receives a signal for specifying that the power transmission apparatus does not detect the object performing the communication that is based on the standard of NFC.

20. The power receiving apparatus according to claim 7, wherein the control unit disables communication function that complies with the standard of NFC.

21. The power receiving apparatus according to claim 20, wherein the control unit activates the communication function that complies with the standard of NFC in a case where the second communication unit transmits a signal for stopping a wireless power transfer.

22. A control method for a power transmission apparatus comprising:
wirelessly transmitting power to a power receiving apparatus including:
a power receiving unit configured to wirelessly receive power from a power transmission apparatus,
a first communication unit configured to perform communication that is based on a standard of Near Field Communication (NFC),
a control unit configured to control the first communication unit not to perform the communication that is based on the standard of NFC, and
a second communication unit configured to transmit, to the power transmission apparatus, a signal for requesting a result of a detection of an object performing the communication that is based on the standard of NFC, after the second communication unit receives a signal for specifying that the power transmission apparatus detects the object performing the communication that is based on the standard of NFC and after the control unit controls the first communication unit not to perform the communication that is based on the standard of NFC;
detecting an object performing communication that is based on the standard of NFC; and
transmitting a signal including information representing a result of a detection of the object in response to the signal for the requesting the results of the detection of the object from the power receiving apparatus.

23. The control method according to claim 22, wherein the signal for the requesting the result of the detection of the object is a general request defined in a standard of Wireless Power Consortium (WPC).

24. The control method according to claim 22, wherein the signal for the requesting the result of the detection of the object is a specific request defined in a standard of WPC.

25. The control method according to claim 22, wherein the information representing that the object performing the communication that is based on the standard of NFC is detected is "1", and the information representing that the object performing the communication that is based on the standard of NFC is not detected is "0".

26. A control method for a power receiving apparatus comprising:
wirelessly receiving power from a power transmission apparatus;
performing communication based on a standard of Near Field Communication (NFC);
performing control not to perform the communication that is based on the standard of NFC; and
transmitting, to the power transmission apparatus, a signal for requesting a result of a detection of an object performing the communication that is based on the standard of NFC after receiving a signal for specifying that the power transmission apparatus detects the object performing the communication that is based on the standard of NFC and after performing control not to perform the communication that is based on the standard of NFC.

27. The control method according to claim 26, wherein the signal is a general request defined in a standard of Wireless Power Consortium (WPC).

28. The control method according to claim 26, wherein the signal is a specific request defined in a standard of Wireless Power Consortium (WPC).

29. The control method according to claim 26, further comprising receiving, in response to the signal, a response signal including information representing a result of the detection of the object performing the communication that is based on the standard of NFC.

30. The control method according to claim 29, wherein the information representing that the object performing the communication that is based on the standard of NFC is detected is "1", and the information representing that the object performing the communication that is based on the standard of NFC is not detected is "0".

* * * * *